Oct. 20, 1970     R. J. KALTHOFF ET AL     3,534,904

CONSOLE AND CONTROL CIRCUIT

Filed April 4, 1966     11 Sheets-Sheet 1

INVENTORS
Robert J. Kalthoff
Frederic R. S. Sanborn
Daniel J. Bandenburg

BY Wood, Herron & Evans
ATTORNEYS

Oct. 20, 1970  R. J. KALTHOFF ET AL  3,534,904
CONSOLE AND CONTROL CIRCUIT

Filed April 4, 1966  11 Sheets-Sheet 7

INVENTORS
Robert J. Kalthoff
Frederic R. Sanborn
Daniel J. Bandenburg
BY
Wood, Herron & Evans
ATTORNEYS

_United States Patent Office_  
3,534,904  
Patented Oct. 20, 1970

3,534,904  
CONSOLE AND CONTROL CIRCUIT  
Robert J. Kalthoff, Frederic R. G. Sanborn, and Daniel J. Bandenburg, Cincinnati, Ohio, assignors to O.K. Partnership, Cincinnati, Ohio, a limited partnership of Ohio  
Filed Apr. 4, 1966, Ser. No. 539,792  
Int. Cl. G06k 1/08, 21/06  
U.S. Cl. 234—48                            24 Claims

ABSTRACT OF THE DISCLOSURE

A console and control circuit is disclosed for controlling document coding and retrieval apparatus utilized in a retrieval system of the type wherein one or more documents notched in adjacent character fields arranged along one or more edges in accordance with a predetermined code are selected from a plurality of like documents randomly stored in a document storage compartment. The console and control circuit includes a keyboard unit having a plurality of selectively operable keys for generating character code signals corresponding to the coded data notched in the character fields of the edge of a document to be retrieved, or the coded data to be notched in the character fields of the edge of a document; means for generating a stepping signal each time one of the character keys is actuated; and means for transmitting the character code and stepping signals to character entry means associated with the retrieval system or document coder, as the case may be, to effect the sequential entry of the keyed characters into the character fields of the entry means as the entry means moves from field to field in response to said stepping signals. Additionally, included are a plurality of character field indicating means responsive to the stepping signals for visually indicating the character field at which the entry means, at any given time, is positioned. Also provided is a detachably mounted key indicating plate having labeled key receiving apertures therein for visually correlating the console keys with the character code signals generated thereby.

---

This invention relates generally to data retrieval systems and more specifically to a console and circuit for controlling coding and retrieving apparatus used in conjunction with a system for retrieving randomly filed documents notched along one or more edges in accordance with a predetermined code.

One data retrieval system, which utilizes the present console and control circuit, is disclosed in the copending application by Robert J. Kalthoff et al. for "Data Retrieval Apparatus and Method," Ser. No. 539,716, filed Apr. 4, 1966, now issued Pat. 2,450,261. In the system disclosed in the above application, documents of many different sizes and types may be employed. For example, while the system has been found to be particularly useful for handling rectangular data cards, it is also contemplated that the system be used in conjunction with microfiches, film jackets and the like.

As for the content of the documents in contrast to their form, the documents may contain excerpts from books or magazines such as would be useful in library research. Alternatively, the documents may hold microfilm images of blueprints of the type typically used in a manufacturing plant. Another possible use of the documents would be to store an employee's personnel data, such as, the employee's age, marital status, education, sex, specified job skills, work experience, etc. A still further possibility, useful to realtors, is to store information on the documents describing houses for sale, such as, type of construction, number of stories, bedrooms and lavatories, age of the house, location and address, price, etc. As is evident from above, the particular type of information stored on the documents is practically without limit and in each case can be tailored to the peculiar needs of the user, whether he be a librarian, machinist, personnel manager or realtor, as in the above examples, or someone engaged in an equally diverse business enterprise.

Each document, taking a card as illustrative, which is stored in this system, is provided with a large number of coded description or characters related to the information content of the card. For example, in the case of a real estate filing system, each of the cards would be provided with descriptors or characters identifying the house construction, age, number and type of rooms, location and address, price, etc. These descriptors or characters each take the form of a group or field of selectively notched contiguous notch sites located along the edge of the card termed the sorting edge. In one preferred coding method, the card includes thirteen fields of notch sites. Each field contains five sites and may be alpha-numerically coded in accordance with a two-out-of-five code or may be coded with bits utilizing various combinations of from one to five notches. It is to be expressly understood that this indicated choice of code, as well as the number of fields per card and sites per field, are merely preferred, other codes and field numbers and sizes being possible. For example, in contrast to the preferred coding technique, a card could be utilized having ten six-bit fields coded in bit fashion, that is, coded in a fashion such that any combination of from one to six bits are coded in a field by notching any combination of from one to six notch sites.

The notching of the cards is accomplished by placing the cards in a coder, for example, one of the coders of the type disclosed in the copending application to Robert J. Kalthoff et al. for "Coder" Ser. No. 539,708, filed Apr. 4, 1966. As indicated in that application, the particular coder used depends on the needs of the user, particularly whether or not duplicate cards are required. Specifically, in one coder embodiment, the non-duplicating coder, the card is placed in a carriage, which is moveable transversely relative to a set of five stationary punches in response to stepping signals. The punches are selectively operable in response to character code signals to notch the card on a field-by-field basis as the carriage held card moves relative to the punches in field-by-field fashion in response to the stepping signals.

In the other two coder embodiments, the two duplicating coders, the cards are placed in a carriage having a memory unit fixed thereto. The memory unit has memory fingers for each site or bit of every field, which are settable in response to character code signals. The carriage and memory move in response to stepping signals in field-by-field relationship relative to a single selectively operable site notching punch, a bank of five bit actuators, and a memory finger sensing station. As the carriage and memory unit move, the memory fingers corresponding to the desired code to be notched are set in response to the character code signals. In addition, the set fingers are sensed at the sensing station, actuating the punch to thereby notch the sites in accordance with the desired code. Duplicate cards are produced by again moving the carriage relative to the sensing station, thereby repeating the finger sensing process and notching the card. In one of the duplicating coder embodiments, the finger setting and card notching operations are substantially simultaneous, while in another embodiment, a second carraige traversal is necessary, following the finger setting operation, in which the fingers are sensed and the sites notched.

One of the principal objects of the present invention is to provide a console and control circuit for controlling such coding devices. The coders are intended for use by personnel relatively unskilled in the operation of computers or sophisticated document retrieval equipment. For example, it is contemplated that a manufacturing plant may have a large number of decentralized data retrieval systems, including coders located at various points of use, such as the engineering department, billing department, personnel department, production department and the like. Also, the data retrieval systems and coders are intended for use in small offices and by professionals, such as lawyers, doctors and the like. Accordingly, one important desireratum of the present console is that it must be relatively simple to operate so that any user can code his own cards without being required to understand all of the intricacies of a two-out-of-five or other coding method.

In general, one preferred embodiment of the present console includes a keyboard having alpha-numeric and bit keys containing the letters and numbers corresponding to the various characters to be entered. The operator depresses one numerical or alphabetical key for each alpha-numeric code to be entered. The operation of this key automatically causes the proper combination of two-out-of-five notches to be made. The operator need know nothing whatsoever of the actual notching scheme. Similarly, the actuation of a bit key causes a notch to be made in the proper bit sites, or site, corresponding to the bit selected; and again, the operator is not required to have any knowledge of the details of the coding scheme.

The present console and control circuit further includes means for causing a code to be entered in, or omitted from, any desired field and the field which the coder is conditioned to notch at any given time is visually indicated to the operator. The console automatically shifts the coder to the next field after an alpha-numeric code is entered and a "Space" key is provided for shifting the coder to any selected field without entering a code.

In the data retrieval system referred to, cards bearing the code notched descriptors are randomly stored with their notched sorting edges parallel to one another in a selector device of the type disclosed in the copending Kalthoff et al. application for "Data Retrieval Apparatus and Method," cited previously. The cards, each of which has a ferromagnetic implant, are brought into contact with a magnet forming part of the selector device which holds them suspended in place. The selector device also contains a series of rejection bars traversely disposed to and normally spaced from the card sorting edges. The bars are selectively movable toward the sorting edge of the cards into a set position in accordance with the coded notch pattern of the card to be retrieved. A set of five bit actuators mounted on a carriage and movable in field-by-field fashion relative to the fields of bars in response to steping signals is provided to set the fields of bars. The actuators set the fields of bars on a field-by-field basis in response to the character code signals as the carriage steps in response to the stepping signals. The actual selection operation involves advancing the rejection bars in unison into contact with the sorting edges of the cards which is effective to push, or reject, all cards not having coded notches conforming to the rejection bar pattern from the magnetic field. The desired cards, that is, those having the conforming notch pattern, are not shifted, but remain in contact with the magnet, since the selector bars enter the notches coded in these cards. Subsequently, these unrejected, or selected, cards are withdrawn from the machine and the rejection bars automatically reset to their original position.

This system of mechanically selecting cards makes it possible to search for cards in several different modes. In this regard, one search technique makes it possible to locate a single card from a series of randomly stored cards. For example, knowing the address of a house for sale, it is possible to retrieve the single card coded with the address.

It is possible, in addition, in a multiple access mode. Specifically, all of the cards of a given class, that is, having the same descriptor, may be retrieved in a single operation, as for example, all houses for sale having split-level construction.

It is also possible to search in a multiple cross access mode, that is, a mode in which all those cards are selected which simultaneously conform to each of a number of descriptors or classes. For example, all cards can be retrieved describing houses for sale which have split-level construction, four bedrooms, and are constructed of brick.

A further, winnowing search mode is contemplated in which rejection bars are first set corresponding to one or more, but less than all, of the descriptors. The bars are thereafter shifted in unison to reject non-conforming cards and the unrejected or selected cards momentarily withdrawn. After this initial separation, the user visually observes the number of cards selected. In some cases an appropriate number of cards have been selected, and these are removed without a further sort. On the other hand, an excessive number of cards may have been selected; so that it desirable to further restrict the field of search to reduce the number of cards selected. In this search mode, the bars are not automatically reset, at the end of the initial sort as in the previously described modes, but remain set. This permits additional bars to be set corresponding to one or more additional descriptors to thereby narrow the subsequent search without having to again set the bars initially set for the initial search. For example, assume a prospective home buyer is generally interested in split-level houses having four bedrooms. In the initial search, the bars corresponding to split-level homes having four bedrooms are set, and the cards describing homes having these two features are selected by moving the bars in unison against the cards. The number of selected cards, which might amount to some two hundred, for example, is observed. Two hundred homes is obviously too many to inspect, so the buyer further delineates his choice by indicating his interest in brick construction. In this search mode, since the bars have not been automatically reset at the conclusion of the first search, it is only necessary for conducting the second search to set the bars corresponding to the buyer's further statement of home choice, that is, brick construction, thereby saving the time involved in again setting the bars corresponding to the split-level and four bedroom descriptors. Thus, by not resetting the bars after each search, it is possible to quickly conduct a series of successively narrower searches until the search produces a manageable number of cards. As indicated, this is accomplished by setting, in successive searches, only those bars corresponding to the newly added descriptors.

Another important object of the present invention is to provide a console and control circuit for governing operation of one or more selector devices in any of the various possible search modes. Again, since the selector devices will usually be operated by personnel not familiar with sophisticated document retrieval devices, it is an extremely important aspect of the present console that its operation is simple and requires only a minimum understanding on the part of the operator.

More particularly, the keys of the present console represent the numbers, letters and bit characteristics corresponding to the code symbols to be entered in the various fields. The depression of any of the letter or number keys of the alpha-numeric group automatically causes the proper combination of rejector bars to be set in a given field. The operator is not required to know, for example, that the letter "A" might correspond to the actuation of the first and second bars in a field, the letter "B" corresponds to the actuation of the first and third bars and so forth. The present console provides a clear, visual indication of the field in which a code will be entered in the selector device, and the operator merely depresses a single key corresponding to that code. Alternatively, the operator may actuate a space key so that no code is entered in a field. Finally, after a code is entered, the operator depresses a single key designated a "select" key. Depression of this single key is effective to cause the selector to conduct a sorting operation in accordance with the codes which have been entered. The control circuit is effective to cause the selector not only to separate the selected cards, but also to clear the codes which have been entered and to condition the selector device for a subsequent sorting operation.

A further object of this invention has been to provide a single console and control circuit of extreme versatility such that the console and control circuit can be used to control both the operation of any of a variety of coders used to notch the cards and also one or more selector devices used to retrieve the notch cards. More specifically, the present console and control circuit can be utilized to control operation of any of the coders disclosed in the copending application of Robert J. Kalthoff et al. for "Coder," i.e., the non-duplicating coder or one of the other of the duplicating coders, either singly or in combination, to control the notching of one or more cards in accordance with any desired code. The same console can also be used to control either one selector or a whole bank of selectors to effect the retrieval of desired cards.

The advantage of utilizing a single console for controlling both the coders and selectors is twofold. First, the investment in equipment is reduced, since separate consoles for both coders and selectors are not required, and second, operator training time is reduced, since an operator need only become familiar with the operation of the one console used with both devices.

To this end, a console and control circuit have been provided having a plurality of numeric and alphabetic keys similar to those on a typewriter or adding machine, which when actuated generate character code signals comprising different coded combinations of binary signal pairs. The binary signal pairs are transmitted to the coder or selector, as the case may be, actuating different pairs of coder or selector bit actuators, the pairs being in accordance with the particular two out of five code for the key depressed. Also provided in the console are means for generating a stepping signal in response to character key actuation simultaneously with the generation of a character code signal. This stepping signal is transmitted to the coder or selector, depending on which is being utilized, for stepping the coder or selector carriage to the next field, automatically readying the coder or selector for the receipt of the next pair of binary code signals corresponding to the next character to be notched on the card, or field of bars to be set in the one or more selectors being utilized.

The use of these alpha-numeric code keys provides two advantages. First, since the console does the coding for the operator, the operator need not be well-versed in coding techniques, and, second, since the sequencing of the machine is concurrent with actuation of an alpha-numeric key, two codes cannot inadvertently be entered into the same field, as could result in a machine without this feature, if, for example, the operator is interrupted and forgets to advance the machine to the next field before entering the next character.

The keyboard is also provided with a set of bit keys which permit the card fields to be notched or rejection bars set in accordance with other code techniques if the two-out-of-five coding is not desired, thereby greatly enhancing retrieval system coding capabilities. The bit keys, when actuated, generate bit signals, which are transmitted to either the coder or selector, as the case may be, for operating the associated bit actuators, either notching card sites or setting bars corresponding to the bit keys depressed.

One aspect of the present invention is that the operator may enter one or a plurality of bits (superimposed coding) in a single field. This is facilitated by the provision of a circuit in which the bit keys do not generate a space or stepping signal. Rather, when actuating these bit keys, it is necessary in order to advance the carriage to the next field, to depress a special "Space" key. This latter key is also effective to permit any desired card field or rejection bar field to go unnotched or unset, respectively.

In addition to the above keys, a plurality of selector keys are provided corresponding to the number of selectors to be controlled. When a particular selector key is actuated, a signal is generated which is transmitted to the particular selector whose key was depressed, thereby conditioning or enabling that selector for the subsequent bar setting and card retrieving cycles. If a plurality of selector keys are actuated, a corresponding plurality of selectors are conditioned. An "All" key and a "Reset" key grouped with the selector keys, are also provided. The "All" key enables, or conditions, all the selectors when actuated. The "Reset" key when actuated disables, or de-conditions, all selectors which, at the time of "Reset" key actuation, are in the enabled, or conditioned, state.

An additional objective of this invention has been to provide a console and control circuit having the capabilities described above, which has the further capability of being able to prevent automatic resetting of the selector rejection bars should it be desired to search in the winnowing mode previously described. To this end a "Hold" key is provided, which, when actuated, disables the automatic selector rejection bar resetting means, thereby enabling successively narrower searches to be conducted without, in successive searches, having to again reset the bars utilized in the previous search.

The console and control circuit previously described, which is equipped with alpha-numeric and bit keys, is a general purpose unit in the sense that it is, without modification, suitable for controlling selectors used in diverse organizations, such as in realty operations, personnel departments, etc., wherein the various users require coding schemes uniquely suited to their individual needs. Stated differently, such a console and control circuit as described above can be used without modification and with substantially the same degree of ease regardless of the particular field of application in which the selector is employed or the coding scheme used. The reason for this is that since the keyboard has alphabetic, numeric and bit keys, the keyboard is indifferent to or independent of, the particular type of information stored or coding scheme used. Thus, it is possible to code a field in any manner desired merely by entering into the field the number, letter, bit or group of bits corresponding to the code entry desired.

Of course, the user of the general purpose console must be familiar with the coded significance of each of the various alpha-numeric and bit entries possible in the different fields. For example, in a real estate application the stored cards describe homes for sale and are coded with characters describing the features of the home, such as location, price, number of rooms, etc. Thus, the user must know into which field or fields entries relating to a specific feature, such as "location" of the home, are made. Knowing, for example, that "location" is entered into field 1–3, the user must also know, for example, that the characters I, N and H entered into fields 1, 2 and 3, respectively, represent the village of Indian Hill. While the console user need not know that when the letters I, N and H are entered into a given field group the $c$ and $e$, $a$ and $e$, and $b$ and $e$ selector bars respectively for that field group are set in accordance with the two-out-of-five codes for the letters I, N and H, the user must at least know that the letters, I, N and H represent the "location" of "Indian Hill" and that "location" entries must be made in fields 1–3.

In practice, a chart is used to relate the fields to the various classes of features and the keys within the fields to the different features within a class to which they correspond, thereby providing a convenient means of conveying to the console user the information necessary for proper console operation. Such a chart would, for example, indicate that "location" is entered into fields 1–3 and that within these fields, I, N, H, represents the Indian Hill location. Similarly, the chart would indicate that the style feature is entered into field 8 and that in this field a "ranch" home is entered into the console by actuating the bit key c, "colonial" home is entered by actuating bit key a, etc.

In certain instances, it has been found desirable to eliminate the need for a chart of the type described in the preceding paragraph, or at least reduce the number of instances in which it must be relied upon in a retrieval cycle. For example, where it is desirable to enable an operator to make keyboard entries with a minimum expenditure of time, the chart method, notwithstanding its inherent simplicity, is not utilized for entries in a majority of the fields, and ideally is not utilized for any entries, because a different method of keyboard entry has been found to be quicker, and hence, more suitable for rapid entries. Specifically, one objective of this invention has been to provide a console and control circuit which permits keyboard entries to be made with great rapidity. To this end, a special purpose console and control circuit is provided.

More specifically, a keyboard is provided which includes a plurality of key groups, each group being associated with a different character field and each key of a group being associated with a different entry within that character field. For example, in the realty application there are, in addition to the alphabetic keys used to enter the "location" into fields 1–3, ten groups of keys correspondingly to the ten remaining fields, each group having five keys representing the five different entries available in their associated field. Thus, in the style field there is a "ranch" key, a "colonial" key, a "modern" key, a "split" key, and an "other" key which correspond to the various "style" feature entries possible in that field. In addition, the keyboard includes means for visually indicating the field to which the console is addressed. This field indicating means is correlated with groups of keys in a manner such that when the console is ready for the entry of, for example, the "style" feature, the field indicating means visually indicates to the operator that the "style" key group can now be used to make a "style" entry, that is, that the console is addressed to the field in which a "style" feature can be entered.

The advantage of providing (1) keys which individually represent different features such as ranch, colonial, etc. (2) grouping the keys relating to the same class of features, such as grouping the style keys, and (3) providing field indicating means which correlate the groups with the respective fields into which they are entered and indicate which group is ready for entry, is that it becomes unnecessary to resort to a chart to determine into which field a class of features is entered and which key in the field corresponds to a specific features within that field. Hence, more rapid entries are possible.

Under certain conditions of use it has been found desirable to provide a single keyboard suitable for use in conjunction with a plurality of special purpose consoles. For example, an automobile manufacturer may have one retrieval system in which personnel data is stored and another in which automobile inventory data is stored, and desires that both systems be operated from special purpose consoles, but that only one keyboard be required.

A further advantage of this invention has been, theretofore, to provide a key board suitable for use with special purpose consoles, which has a substantial range of flexibility. To this end, a keyboard of the type described previously, but having a plurality of unlabeled or blank alpha-numeric and bit keys, is provided. To identify the keys for the various applications in which the keyboard is used, apertured overlays through which the unlabeled keys protrude are provided. On the overlays at a point adjacent each key receiving aperture, a key designation is provided indicating the significance of that particular key, as for example, in a relay overlay, brick home, ranch-type home, etc. The overlays may be quickly and easily interchanged when it is desired to change the particular application in which the console is to be used. Thus, the mere change of an overlay converts a special purpose console used by the sales department to check automobile inventories into a special purpose console for controlling a selector used in the personnel department to locate employees having certain skills, experience, education, etc.

Other objectives and advantages of the invention will be readily apparent to those skilled in the art from the following detailed description of the drawings in which:

FIG. 14 is a schematic diagram depicting a keyboard and display panel useful in a real estate application in which the keys are identified by feature and grouped in vertical columns which are correlated with the field indicating lamps of the fields in which the features are to be entered;

FIG. 15 is a schematic diagram of an overlay useful in an automobile inventory application.

CONSOLE CIRCUITRY

Figure 1:
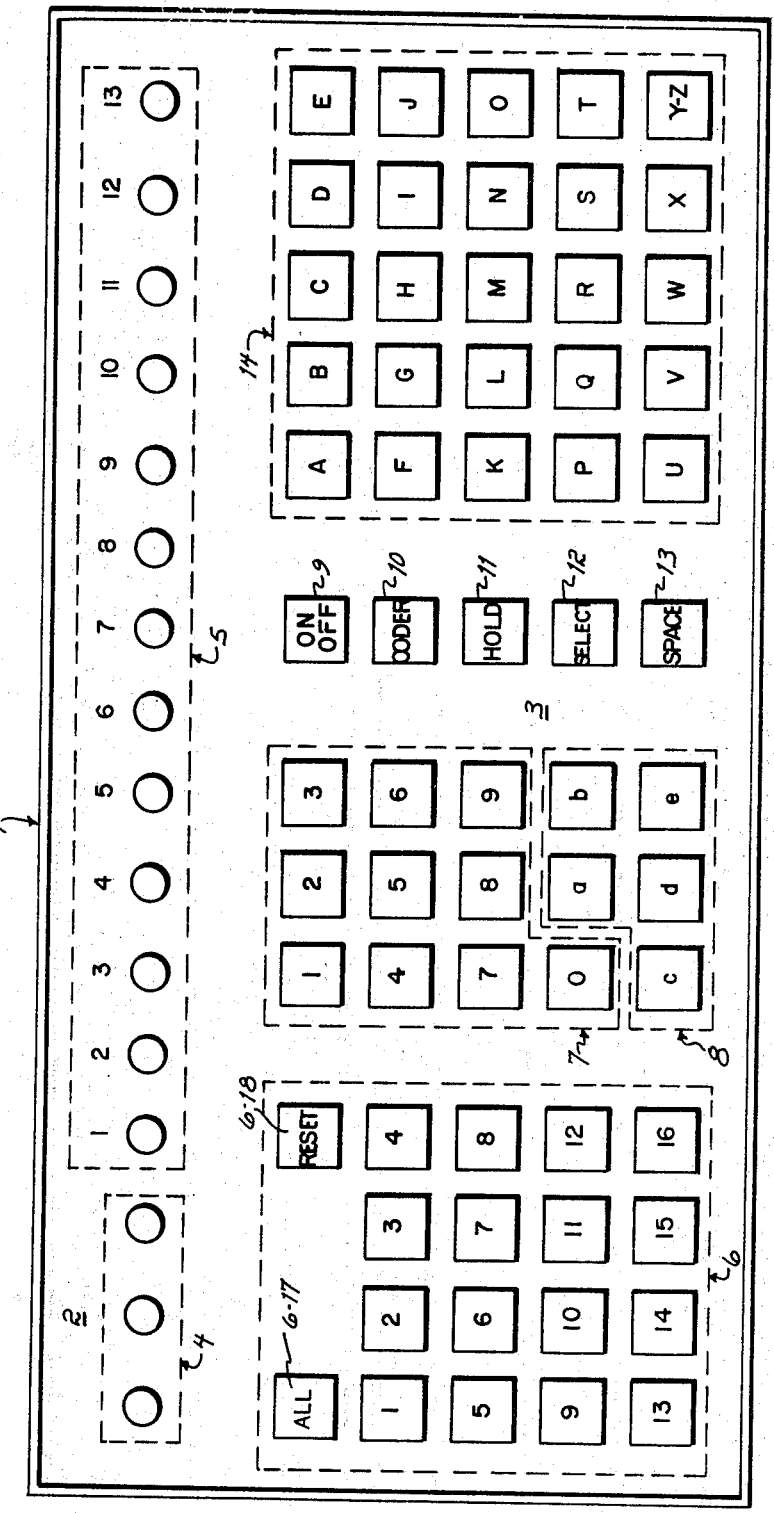
FIG. 1 is a schematic diagram depicting the relationship of the general purpose console keyboard and display panel as well as the arrangement of the various keys and indicating elements comprising the keyboard and display panel.
Figure 2:
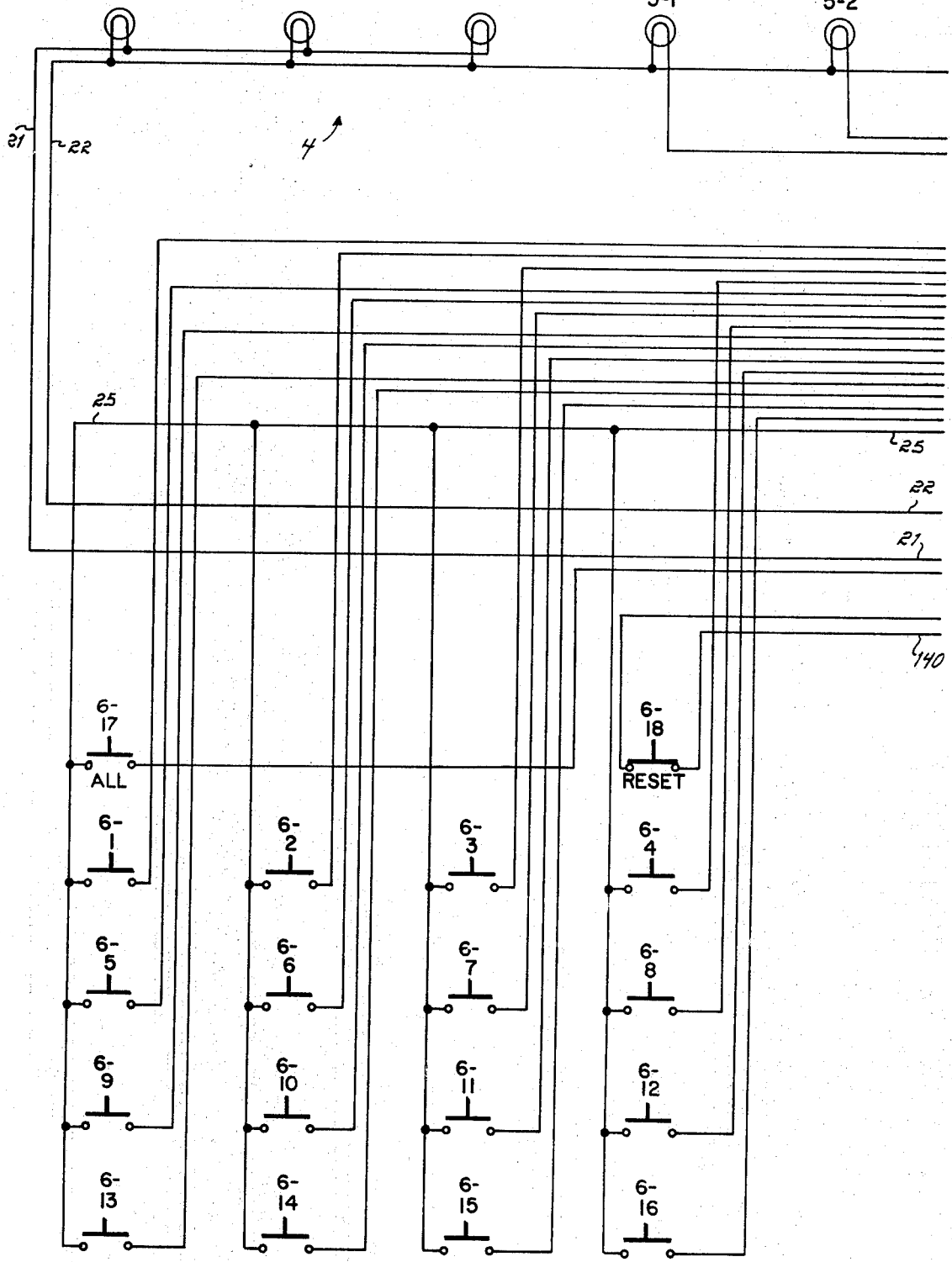
FIGS. 2–4 are schematic circuit diagrams of portions of the control circuit of this invention showing the numeric, bit, function and alphabetic keys, and the indicating elements and their various electrical interconnections.
Figure 3:
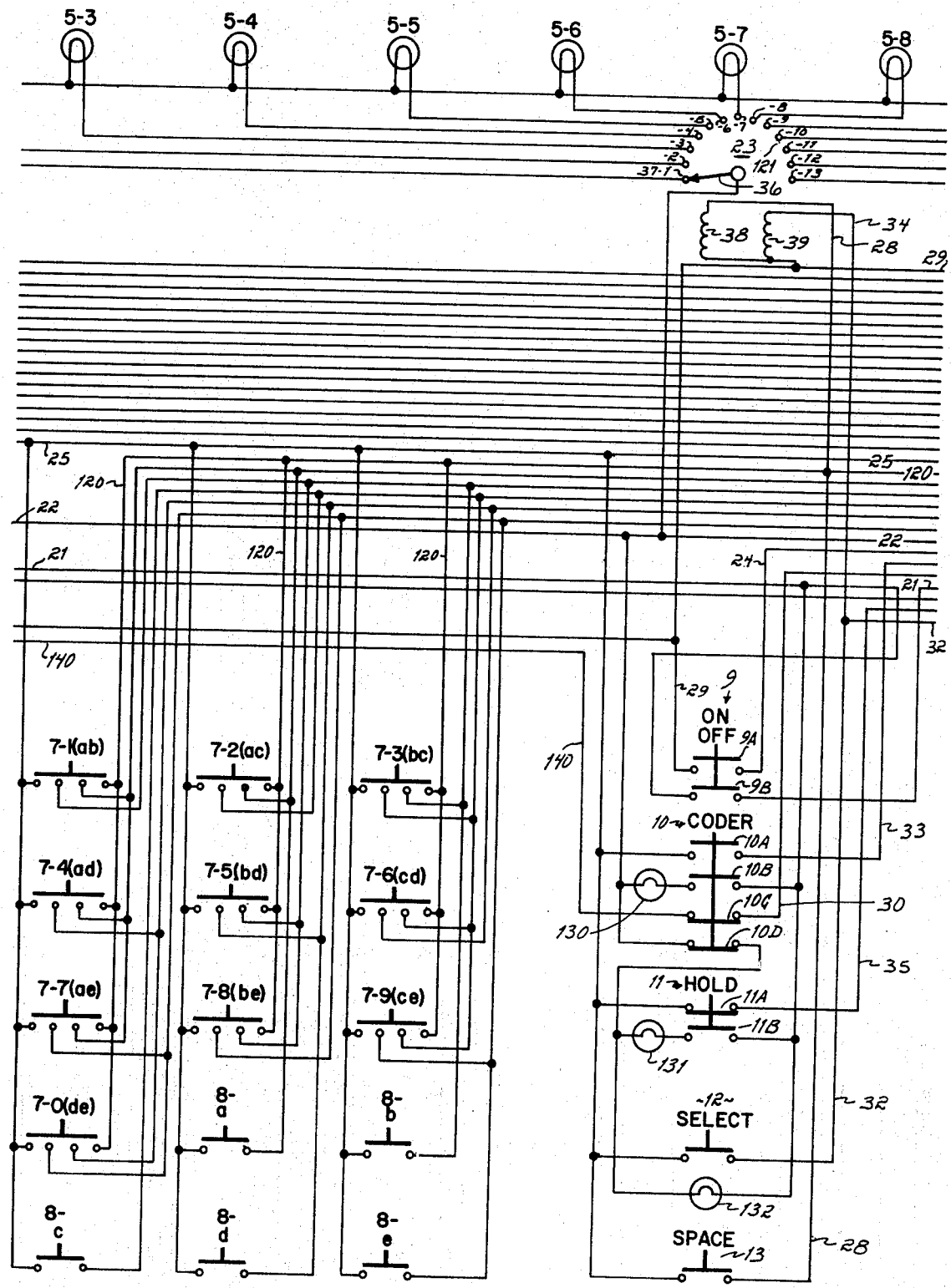
Figure 4:
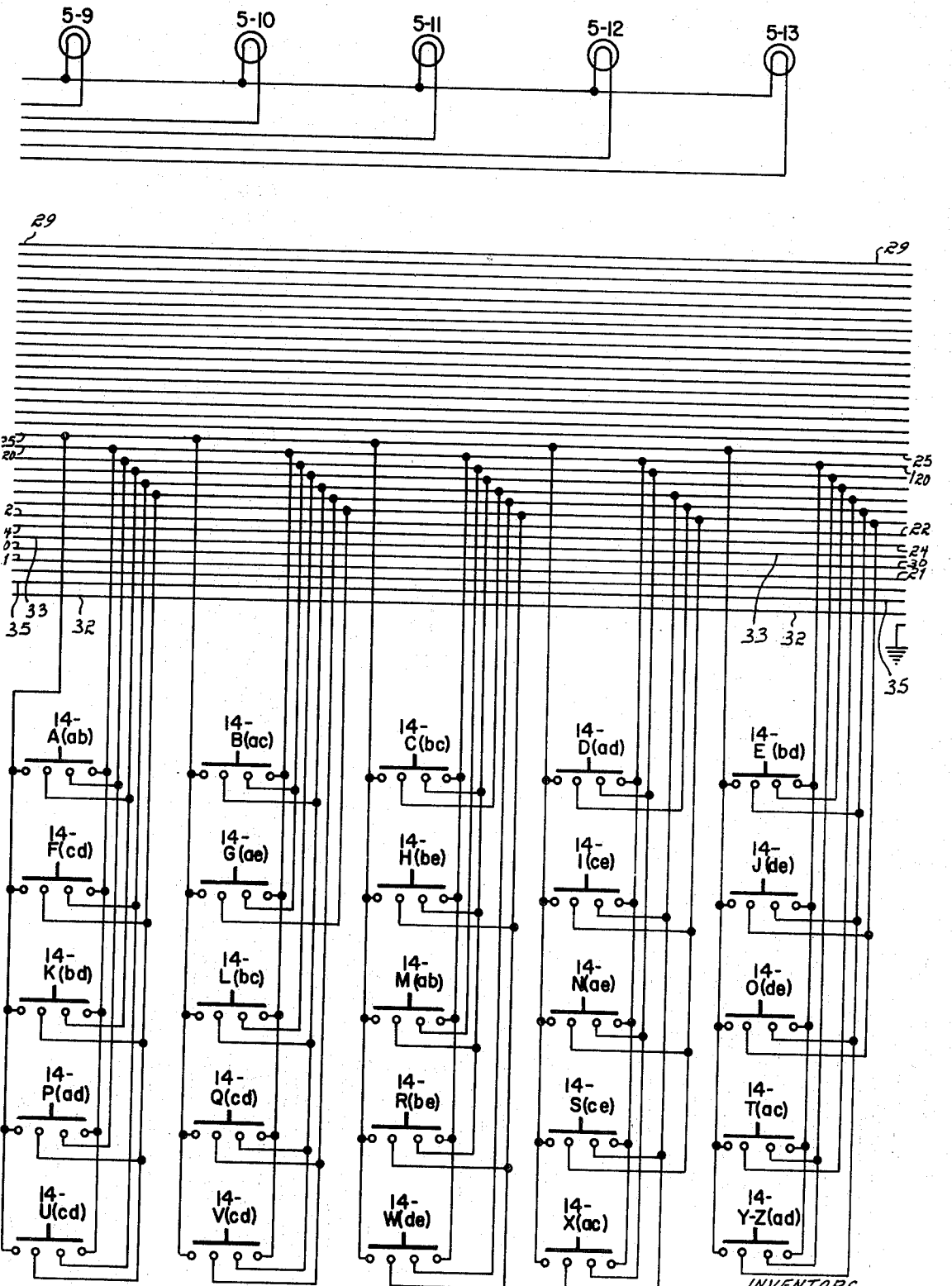
Figure 5:
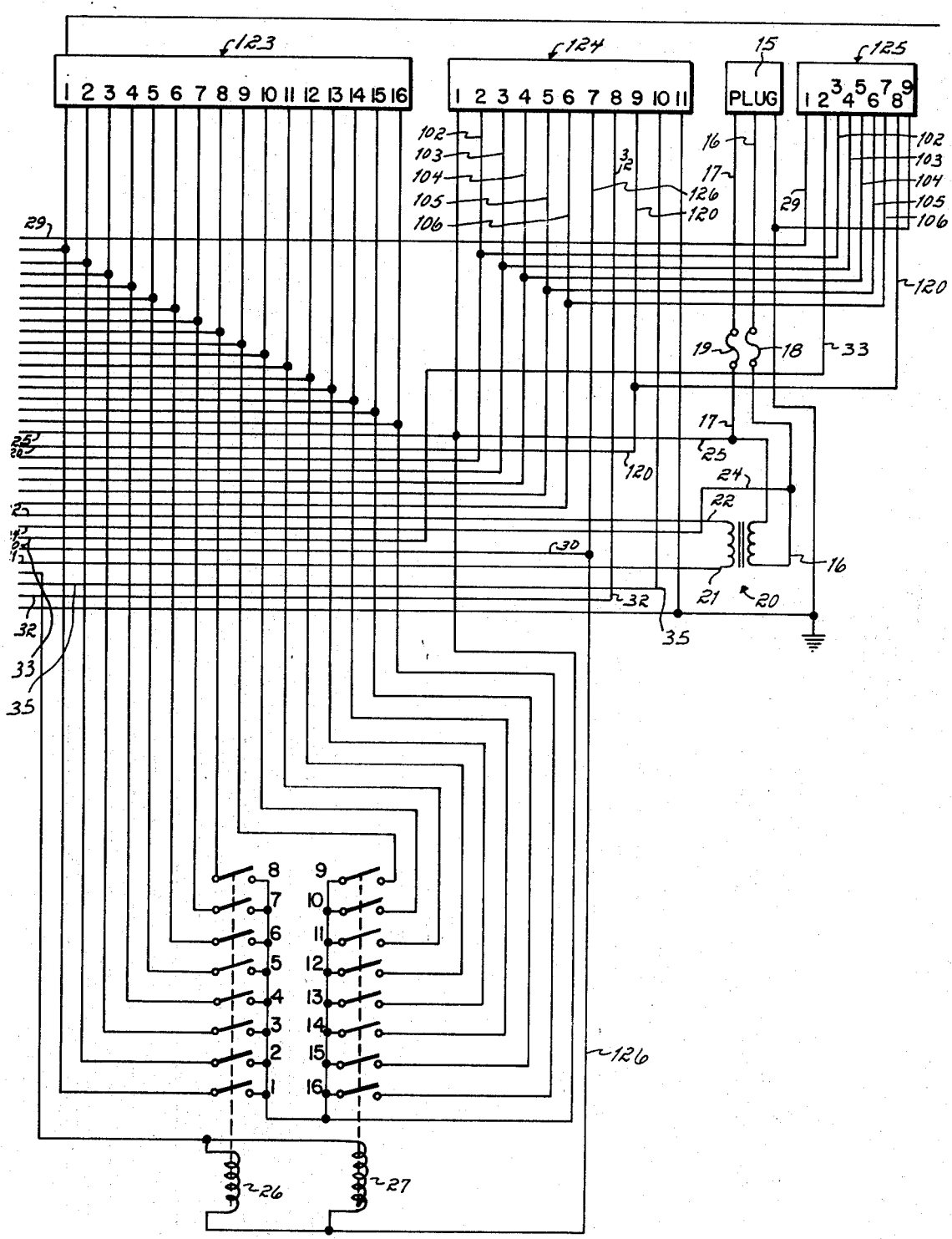
FIG. 5 is a schematic circuit diagram showing the various terminal jacks of the console of this invention and their respective connections.

As shown in FIG. 1, the general purpose console includes a control panel 1 having an upper horizontally extending display panel 2 and a lower horizontally extending keyboard 3. The display panel 2 comprises a group of three console status lamps 4 and a group of thirteen character field indicator lamps 5, connected in a manner to be described, for providing, respectively, visual indications of the energization condition of the console and the particular one of the thirteen character fields to which the console is presently addressed.

The keyboard 3 includes group of selector keys 6, numeric code keys 7, bit keys 8, function keys 9–13, and alphabetic code keys 14. The on-off key 9, in conjunction with the coder key 10, functions to control the availability of power for distribution to either the coder or selector units. The selector keys 6 function to determine which, if any, of the selector units are to receive power if power is made available to the selectors as a group. The bit keys 8 are provided to permit the selected notching or searching by the coder or selectors, respectively, of the bits comprising a character field. Similarly, the numeric code keys 7 and alphabetic code keys 14 are provided to permit the selective notching and searching by the coders and selectors, respectively, of numeric and alphabetic characters comprising the character fields. The space key 13 is included to facilitate the advancement of the coders and selectors to the next succeeding character field when coding and searching, respectively, of a field is not desired. The select key 12 is provided to initiate the searching operation once the characters to be searched have been keyed into the console and the rejection bars of the selectors set. The hold key is included to prevent, subsequent to a searching operation, the otherwise automatic resetting of selector rejection bars; that is, to prevent automatic erasure of characters keyed into the console subsequent to a search operation.

As shown more particularly in FIGS. 2–5, the console circuitry includes a three terminal jack 15 adapted to be connected to a conventional 120 volt AC grounded electrical receptacle (not shown) for providing power to the console. Emanating from the three terminal jack 15 is a hot line 16, a neutral line 17 and a ground line. The hot and neutral lines 16 and 17 are connected through suitable fuses 18 and 19 to the primary winding of a conventional step-down transformer 20, the secondary windings of which are connected to a pair of low voltage AC busses 21 and 22 for providing power to the indicator lamps 4 and 5. The hot and neutral lines 16 and 17 are also connected through fuses 18 and 19, respectively, to hot and neutral busses 24 and 25, respectively, for distributing power to the selectors and coders in a manner to be described.

The console is also provided with three output terminal jacks 123, 124 and 125. The jack has a plurality of terminals 123(1)–123(16) corresponding in number to the number of selector keys 6. The number of selector keys 6 in turn corresponds to the number of individual selector units controlled by the console, which, of course, varies according to the needs of the user. In the preferred embodiment, there are sixteen of these selector units having identical circuitry, the circuitry of one selector being shown in FIG. 6 to be described. A detailed description of the structure and operation of a preferred selector unit is contained in the application by Robert J. Kalthoff et al., entitled "Data Retrieval Apparatus and Method," Ser. No. 539,716, filed Apr. 4, 1966, now issued Pat. 3,450,261, the disclosure of which is incorporated herein by reference. The jack 124 contains a plurality of terminals 124(1)–124(11), all of which are connectable to various operating components of each of the selector units. Similarly, the jack 125 contains a plurality of terminals 125(1)–125(9), all of which are connectable to various operating components of each of the coders to be described later. The structure and operation of preferred coders are described in detail in the patent application to Kalthoff et al., entitled Coder, Ser. No. 539,708 filed Apr. 4, 1966, the entire disclosure of which is incorporated herein by reference.

Figure 12:
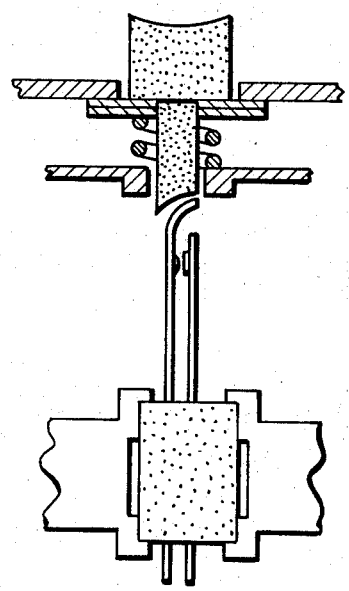

To enable or condition one or more of the selector units, that is, to permit the rejection bars of one or more of the chosen selector units to be positioned in accordance with the characters to be searched, the selector keys 6(1)–6(18) are provided, as previously indicated. The selector keys 6(1)–6(18) actuate single pole-single throw, normally open switches with the exception of key 6(18) which actuates a normally closed switch. A preferred switch actuating key is depicted in FIG. 12, and will be described in detail. It is sufficient to note at this point that the keys are monostable in the sense that they remain actuated only while they are physically depressed and upon release become de-actuated. The keys 6(1)–6(16) are connected in parallel between the common neutral bus 25 and the output terminals 123(1)–123(16), respectively, of the jack 123 and, when actuated, function to complete circuits between the neutral line 17 and main latching relays of the various selector units via bus 25 and terminals 123(1)–123(16) of the jack 123, to which are connected the latching relays of the selectors. Providing certain other conditions are met, the completion of one or more of these circuits serves to energize and latch one or more of the main latching relays of the selectors, thereby enabling or conditioning those selectors to which circuits have been completed and relays latched.

To enable or condition all of the selector units with a single key actuation, an "All" key 6(17) is provided which, in conjunction with a pair of non-latching relays 26 and 27 and their associated contacts 26(1)–26(8) and 27(9)–27(16), respectively, causes circuits to be completed between the neutral line 17 and all of the selector unit main latching relays via the terminals 23(1)–23(16). Specifically, the key 6(17), when actuated, completes a circuit between the neutral line 17 and the relays 26 and 27 via line 140 thereby momentarily energizing the relays 26 and 27, the relays 26 and 27 being connected to the hot line 16 via the on-off key contacts 9A, the contacts of the reset key 6(18), the coder key contacts 10C and lines 30 and 126. The energization of the relays 26 and 27 momentarily closes the normally open contacts 26(1)–26(8) and 29(9)–29(16), respectively, completing the circuits from line 17 to main latching relays of all of the selectors via the terminals 123(1)–123(16), thereby enabling or conditioning all the selector units, as previously noted.

The monostable reset key 6(18) is provided to de-condition or disable selector units which are in the conditioned or enabled state. This key operates a normally closed switch connected between contact 9A of key 9 and contact 10C of coder key 10 in a circuit including lines 29 and 140. In operation, this key when in its normal position, completes a portion of the hot line circuit to the main latching relay of the selectors via line 30. However, when the key 6(18) is momentarily actuated, the hot line circuit to the selector main relays is momentarily interrupted and any main latching relays in the latched condition are deenergized, thereby disabling or de-conditioning the heretofore enabled or conditioned selector unit or units, as the case may be. The actuation of the reset key 6(18) also momentarily interrupts the hot line circuit to the relays 26 and 27 momentarily preventing their energization.

Five bit keys 8(a)–8(e) corresponding in number to the five bits of a character field are provided to permit, independent of the preferred two-out-of-five code technique, selective setting of individual selector rejection bars or notching of individual card notch sites of a character field. The bit keys 8(a)–8(e), which are also monostable, actuate single pole-single throw switches which are connected between the neutral bus 25 and the jack terminals 124(2)–124(6) and 125(3)–125(7) via lines 102–106, respectively. A preferred single pole-single throw switch is shown and discussed with reference to FIG. 12. When one or more of the bit keys 8(a)–8(e) are actuated, circuits are completed, via the neutral bus 25, lines 102–106, the terminals 124(2)–124(6) and 125(3)–125(7), between the neutral line 17 and suitable electromechanical bit actuators in the coders and selectors which are connected to jack terminals 124(2)–124(6) and 125(3)–125(7). The completion of a circuit to a selector or coder bit actuator, providing certain other circuit conditions exist, functions to energize the bit actuator and notch the site or set the selector rejection bar of a given character field, as the case may be, which corresponds to the bit key actuated.

Figure 13:
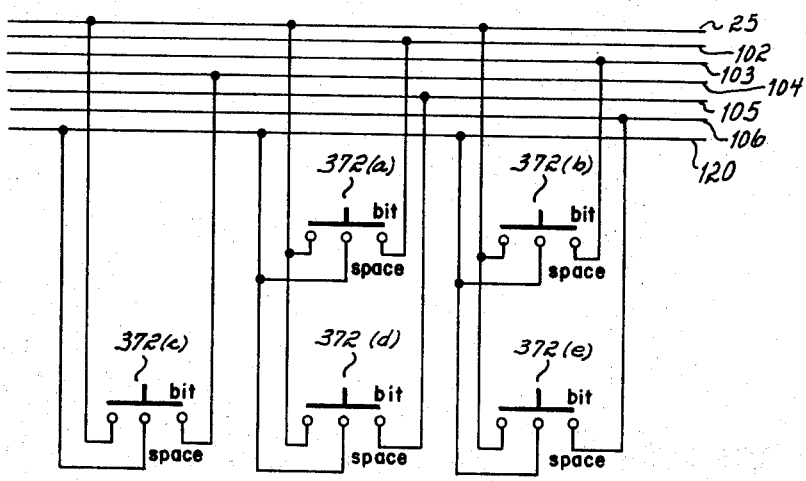
FIG. 13 is a schematic circuit diagram of a portion of the consol and control circuit showing a group of bit keys adapted to produce automatic console and coder or selector stepping when actuated.

If automatic spacing of the character field stepping mechanisms of the coders, selectors, and console is to accompany the actuation of one of the bit keys 8(a)–8(e), the bit key circuit of FIG. 13 may be utilized. Often it is desired to limit the use of the bit keys to the entry of only one bit to a field, which is the case when the bits of a given field represent mutually exclusive features. For example, considered a field in which the A, b, c, d, and e bits represent the following ages of a home, respectively: 5, 10, 15, 25 years and older. Since any given house can have but a single age, the bits are mutually exclusive and the entry of more than one bit into the "age" field of, for example, a card to be notched, would be meaningless and consequently an error. Thus, in this instance, it is desirable to include appropriate circuit connections to the bit keys 8(a)–8(e) for stepping the console and coder stepping mechanisms in response to the actuation of a bit key. To this end, as shown in FIG. 13, circuit means including an additional "space" contact for each bit key 372(a)–372(e) is provided which completes a neutral line circuit to line 120 each time a bit key is actuated thereby stepping the console and selector or coder stepping mechanisms, as the case may be. The other, or bit, contact of each bit key 372(a)–372(e) completes an energization circuit to the bit solenoid associated with the respective bit key, causing the bit to be entered.

To facilitate the searching and notching of numeric and alphabetic characters coded in accordance with a two-out-of-five code, the numeric keys 7(1)–7(0) and the alphabetic keys 14(A) to 14(YZ), respectively are provided. The keys 7(1)–7(0) and 14(A)–14(YZ) are monostable and actuate triple pole-single throw switches of the type shown in FIG. 11, and will be discussed in detail later. Two of the poles of each of the switches are connected to pairs of electromechanical bit actuators in the coders or selectors via the lines 102–106 to jack terminals 124(2)–124(6) and 125(3)–125(7). The pair of bit actuators to which a key 7 is connected correspond to the bits comprising the particular two-out-of-five code for that particular key. A preferred two-out-of-five code is described in greater detail in Kalthoff et al. patent application entitled "Data Retrieval Apparatus and Method," Ser. No. 539,716 filed Apr. 4, 1966, now issued Pat. No. 3,450,261. For example, in accordance with this preferred code, bits b and e comprise the two-out-of-five code designation for the number "8," therefore, two of the poles of the switch actuated by key 7(8) will be connected to the bit actuators b and e. Thus, actuation of key 7(8) completes a circuit including neutral line 17, bus 25, lines 103 and 106, and jack terminals 124(3), 124(6) and 125(4)–125(7) to thereby energize the b and e bit actuators setting the b and e rejection bars or notching the b and e sites of a given character field. The third pole of each of the numeric and alphabetic keys 7(1)–7(0) and 14(A)–14(YZ) is connected via line 120 and jack terminal 124(9) and 125(8) to character field carriage stepping mechanisms located in the coders and selectors and via lines 120 and 28 to the character stepping mechanism 23 of the console. When these circuits are completed, the coder or selector carriage, as the case may be, and the console character stepping mechanism 23 step to the next succeeding character field.

Thus, the actuation of a numeric or alphabetic key 7(1)–7(0) or 14(A)–14(YZ), respectively, completes a plurality of circuits. Two of the circuits completed, as noted, are between the neutral line 17 and selected pairs of electromechanical bit actuators located in the coders and selectors, the circuits being completed via the neutral bus 25, lines 102–106, and the jack terminals 124(2)–124(6) and 125(3)–125(7). A third circuit completed, is between the neutral line 17 and the console character field stepping device 23, via the neutral bus 25 and the lines 120 and 28, while a fourth circuit completed is one between the neutral line 17 and the character field stepping mechanisms of the coders and selectors via the neutral bus 25, line 120, and jack terminals 124(9) and 125(8), respectively. Hence, each time a numeric or alphabetic key is actuated the console character field stepping device 23 advances, a pair of bit actuators is energized, and the character field stepping mechanism of the coders or selectors progresses to the next succeeding character field.

The space key 13, which is monostable and actuates a single pole-single throw switch, is provided to permit selective spacing of the console character field stepping device 23 and the coder and selector character field stepping mechanisms. The space key 13, when actuated, completes a circuit from the neutral line 17 to the console character field stepping device 23 of the console via the bus 25 and the line 28, and completes a circuit from the neutral line 17 to the character field spacing mechanisms of the coders and selectors via the neutral bus 25, lines 28 and 120, and the jack terminal 124(9) and 125(8). Thus, if no entry is desired in a particular one or more character fields, the space key 13 is depressed once per field to advance the console character stepping device 23 and the coder or selector stepping mechanisms to the next field where a character entry is to be made. This selective stepping by successive depression of the space key 13 is in contrast to automatic spacing, which results when a numeric or alphabetic key 7 or 14 is actuated and a coded character entry made in a particular character field.

The selective application of power to the coders, selectors, and the console is controlled by the on-off key 9 and the coder key 10, both of which are bistable. The on-off key 9 actuates a double-ganged switch having contacts 9A and 9B. Contacts 9A of this switch, when the switch is actuated, complete a circuit from the hot line 16 to the coder via the hot bus 24, line 29, and jack terminal 125(1). The on-off switch contacts 9A also completes a circuit from the hot line 16 to the selectors including the hot bus 24, line 29, the normally closed contacts of reset key 6(18), line 140, the normally closed contacts 10C of coder key 10, lines 30 and 126, and jack terminal 124(7). In addition to the above two circuits which are completed when the on-off switch 9 is actuated and the contacts 9A closed, a third circuit is completed namely, a circuit between the hot line 16 and the relays 26 and 27 including the hot bus 24, line 29, normally closed contacts of reset key 6(18), line 140, normally closed contacts 10C of coder key 10, and lines 30 and 126. With this hot line circuit completed, the relays 26 and 27 will become energized, when the key 6(17) is actuated, to thereby enable or condition all the selectors.

Contacts 9B of the on-off key 9, when the on-off key 9 is actuated, close the circuit including line 21 permitting power to be applied to the console status lamps 4 lighting the lamps and thereby indicating that the console is energized. In addition, power is applied to the character field indicator lamps 5, causing the lamp corresponding to the field to which the character field stepping device 23 had advanced, to become lighted thereby reflecting the status of the stepping device 23. Contact 9B also completes a portion of the circuit from the transformer 20 to the windings 38 and 39 of the stepping device 23 as well as a portion of the circuit from the transformer 20 to the lamps 130–132. Thus, closing of contact 9B is necessary to power windings 38 and 39, and lamps 130–132.

The coder key 10 actuates a quadruple-ganged switch having four contacts 10A–10D, contacts 10A and 10B being normally open and contacts 10C and 10D being normally closed. When the coder key 10 is actuated the hot line circuit, including lines 30 and 140, to the relays 26 and 27 and to the selectors is interrupted by the opening of normally closed contact 10C, thereby disabling the selectors and the relays 26 and 27. When key 10 is actuated, contact 10A is also closed completing a circuit between the neutral line 17 and the coder via the neutral bus 25, line 33, and jack terminal 125(2), thereby providing power to the coders assuming contact 9A is also closed. Thus, the actuation of the coder key 10 is effective to switch power from the selectors to the coders, providing the on-off key 9 has previously been actuated.

In addition, when the coder key 10 is actuated normally open contact 10B closes, completing a circuit to indicator lamp 130 which then becomes lighted indicating that the coder key 10 has been actuated and the console is in the code mode. The actuation of the coder key 10 also opens normally closed contact 10D, opening the energization circuit to the indicator lamps 131 and 132 thereby preventing their energization.

Thus, when switch 9 is depressed, power is applied to the console and the console energization condition is indicated by the lighting of the console status lamps 4. In addition, if the coder key 10 has not been actuated, power is applied to the selectors and the selector energization condition is indicated by the lighting of the lamp 132. If instead, the coder key 10 is actuated concurrent with the actuation of on-off key 9, power is applied to the coders and the energization status of the coders is indicated by the lighting of coder lamp 130.

The select key 12, a monostable key, is provided to initiate a searching operation once the desired characters have been entered into the selectors. When actuated, the select key 12 momentarily closes a single pole-single throw switch completing a circuit between the neutral line 17 and suitable operating circuitry in the selectors, to be described, via the neutral bus 25, line 32 and jack terminal 124(8). In addition, actuation of the select key 12 also resets the character field stepping device 23 by completing a circuit between neutral line 17 and the character field stepping device 23 via the neutral bus 25 and line 32, 34.

To prevent the rejection bars of the selectors from being reset following a searching operation, the hold key 11, which is bistable, is provided. The hold key 11, actuates a double-ganged switch having normally closed contact 11A and normally open contact 11B. Actuation of key 11, opens contact 11A interrupting the circuit between the neutral line 17 and the rejection bar resetting apparatus of the selectors to be described. This circuit from the neutral line 17 to the rejection bar resetting apparatus can be partially traced through neutral bus 25, contact 77A, line 35, and jack terminal 124(10). The actuation condition of the hold key 11 is indicated by the lighting of the hold indicator lamp 131, which occurs when the normally open contact 11B closes the circuit to the lamp 131 upon actuation of the hold key 11.

The character field stepping device 23 includes a movable common contact 36 and a stationary emitter 121. The contact 36 completes field indicator lamp energization circuits which include the transformer terminals 21 and 22 and the lamps 5(1)–5(13), as the common contact 36 makes contact sequentially with the contacts 37(1)–37(13) of the stationary emitter. More specifically, the lamps 5(1)–5(13) are selectively connected in parallel across the transformer output lines 21 and 22 through the movable contact 36 of the character field stepping device 23. Thus, the lamps 5(1)–5(13) become successively energized as the arm 36 sweeps in response to either energization of the numeric or alphabetic keys or the space key, thereby indicating the particular character field to which the console is addressed.

The character field stepping device 23 is also provided with the stepping winding 38 and the reset winding 39 which are connected in common at one end to the hot line 29 and at their other ends to the neutral bus 25 via lines 28 and 34 and the contacts of the keys 13 and 12, respectively. By reason of the connection of stepping winding 38 to line 28, the character field stepping device 23 will step one field automatically each time a numeric key 7(1)–7(0) or an alphabetic key 14(A)–14(YZ) or the space key 13 is actuated. By reason of the connection of reset winding 39 to the line 34, the character field stepping device 23 will be reset each time the select key 12 is energized which, as indicated previously, occurs each time a search operation is initiated. Thus, the character field indicator lamps 5(1)–5(13) automatically indicate the character field to which the console is addressed.

KEY-OPERATED SWITCHES

Figure 11:
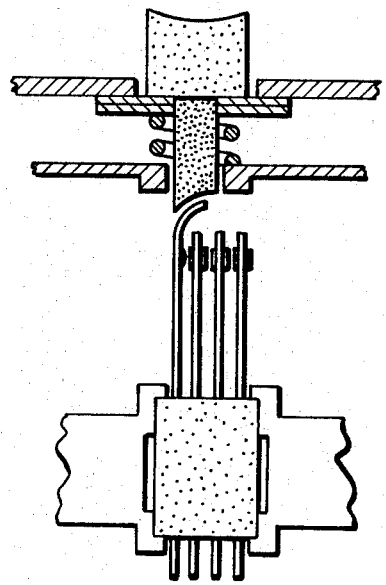
FIGS. 11 and 12 are front elevational views in section of preferred key-operated switches useful with the console keyboard of this invention.

A preferred monostable three pole-single throw key-operated switch for entering alpha-numeric characters in shown in FIG. 11. The switch includes a key 330 having a depending nonconductive finger 331. Also included is a spring 335 which abuts a stationary plate 336 forming part of the keyboard unit at its lower end and which abuts a horizontally extending arm 337 fixed to the key 330 at its upper end. The spring 335 biases the key 330 upwardly against a stationary plate 338 also forming part of the keyboard unit. The finger 331 is provided with a curved camming surface 332 at its lower end for camming closed and completing a circuit between a set of flexible contacts 333, 334(1), 334(2), and 334(3) secured intermediate their ends in a stationary insulating block 339.

In operation, the lower end of contact 333 is connected to the neutral bus 25 and the contact 334(3) is connected to the console space lines 28 and 120. The contacts 334(1) and 334(2) are connected to pairs of the console bit lines 102–106 in accordance with two-out-of-five coding techniques. For example, assuming the key of FIG. 11 is designed to enter the alphabetic character "A," the contacts 334(2) and 334(3) will be connected to $a$ and $b$ bit lines 102 and 103, which correspond to the two-out-of-five code designation for the character "A." Thus, upon depression of the key 330, connected as indicated, the spring 335 is compressed allowing surface 332 to cam the contacts 333 and 334 into electrical contact, completing neutral line circuits from the bus 25 to the console stepping winding 38, the selector or coder stepping mechanism, and to the coder or selector $a$ and $b$ bit solenoids, thereby entering the character "A" into the coder or selector unit, and advancing the console and coder or selector stepping mechanisms to the next successive character field. Upon release of the key 330, the above circuits are interrupted.

In FIG. 12 a monostable single pole-single throw key-operated switch for entering individual bits is shown, in which elements identical to those of FIG. 11 bear like reference numerals. The bit key of FIG. 12 is in all material respects identical to the switch of FIG. 11 except for the presence of only one bit contact 340 and the absence of a contact connected to the console and coder or selector stepping mechanism. In practice, the contact 340 is connected to one of the console bit lines 102–106 and when actuated completes a neutral line circuit to one of the bit solenoids of the coder or selector, enabling individual bits to be entered into the coder or selector as desired.

SELECTOR CIRCUITRY

The circuitry for operating the selector, the structure and operation of the selector itself being described in detail in Kalthoff et al. copending application for "Data Retrieval Apparatus and Method," Ser. No. 539,716, filed Apr. 4, 1966, now issued Pat. 3,450,261, as more particularly shown in FIG. 6, generally includes a tray positioning motor MT for raising the tray prior to the searching operation. In addition, the selector circuitry also includes five electromechanical bit actuators or solenoids S$a$–S$e$ which are responsive individually to the actuation of the bit keys 8, and responsive in coded pairs to the actuation of numeric keys 7 and alphabetic keys 14. The bit actuators S$a$–S$e$ enable the selectors and coders to search and code the character fields in accordance with the console key input. The selector circuitry also includes a space solenoid S$_V$ for advancing the bit actuator carrier on a field-by-field basis. Finally, the selector circuitry includes relays R1–R3 and switches SW1–SW5 for controlling the sequence of operation of the various motors, solenoids, and electromechanical bit actuators.

In the above noted Kalthoff et al. copending application entitled "Data Retrieval Apparatus and Method" the following designations are utilized to identify electrical elements also appearing in this application: switches SW1(a), SW1(b), SW2, SW3, SW4, SW5(a) and SW5(b), solenoids $S_a$–$S_e$, $S_V$, $S_R$; and motors MT and MP. Switches SW1(a) and SW1(b) are in practice each pairs of contacts of a single mechanically tripped switch SW1. Likewise, switches SW5(a) and SW5(b) are each pairs of contacts of a single mechanically tripped switch SW5.

A terminal jack 56 having eleven input terminals 56(1)–56(11) is provided to facilitate the interconnection of the console output terminals 124(1)–124(11), respectively, with the appropriate operating circuit components of the selector. The terminals of jacks 124 and 56 bearing similar parenthetical designations are electrically interconnected to each other. It is to be noted at this point that with the console of the preferred embodiment, which is designed to control sixteen selectors, there would be sixteen such selector circuits of the type shown in FIG. 6. The selector circuits would be connected in parallel with the console output terminals 124(1)–124(11), thus being controlled by a single console of the type depicted in FIGS. 1–5 and having the same response.

Figure 6:
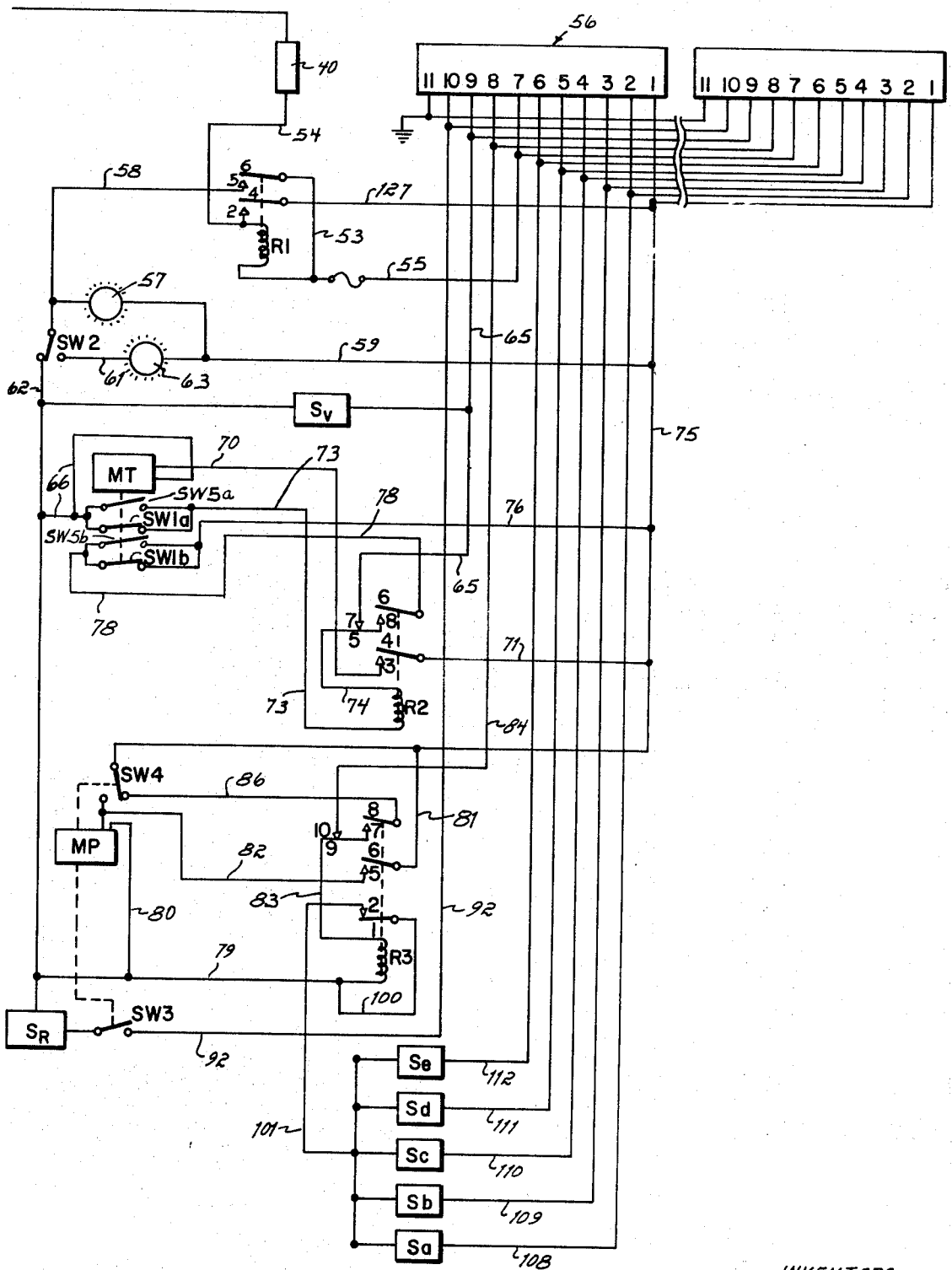
FIG. 6 is a schematic circuit diagram of a portion of the console control circuitry utilized in conjunction with the selector unit.
Figure 7:
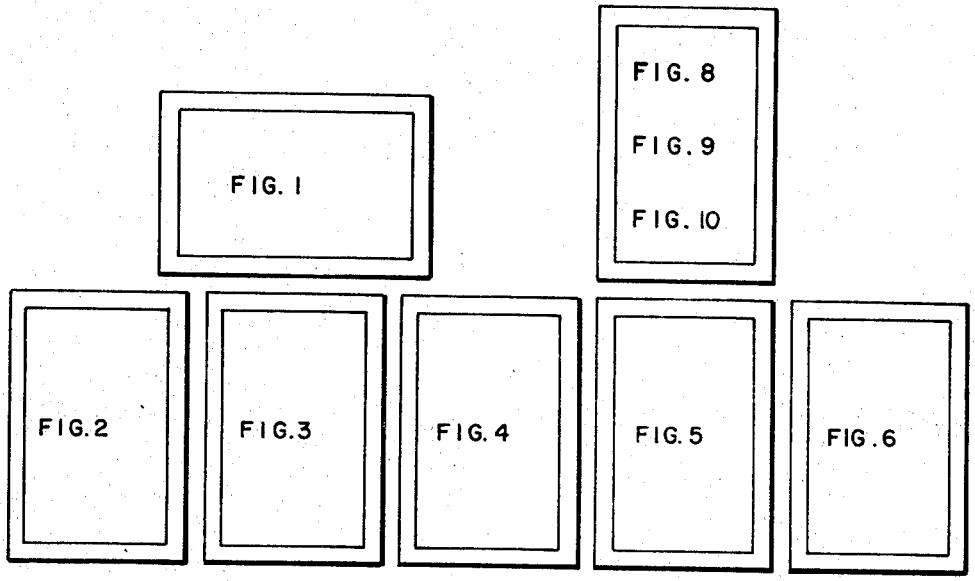
FIG. 7 is a schematic diagram depicting the interrelationship of FIGS. 1–6 and 8–10.

Now, referring to FIG. 6, which shows the circuitry of one of the sixteen selectors of the preferred embodiment, a main latching relay R1 is provided, which has its winding connected between hot line 55 emanating from terminal 56(7) and neutral line 54 emanating from jack terminal 123(1). Relay R1 is energized when the neutral line 54 is completed by actuation of selector key 6(1), which controls this selector, providing, as indicated earlier, that the on-off key 9 has been actuated and the coder key 10 has not been actuated. When the relay R1 is energized, its relay contacts 2–4 and 5–6 close. The closure of relay R1 contacts 2–4 latches relay R1 via line 127 and the closure of contact 5–6 completes the hot line circuit including lines 55, 53 and 58, and terminal 56(7). A ready lamp 57 which is connected between the completed hot line 58 and the neutral line 59 emanating from the jack terminal 56(1), becomes lighted when relay R1 is energized indicating the energization status of the selector.

A mechanically operated switch SW2 actuated by the selector slide or yoke in a manner described in the Robert J. Kalthoff et al. copending application entitled "Data Retrieval Apparatus and Method," Ser. No. 539,716, filed April 4, 1966, now issued Pat. 3,450,261 alternatively connects hot line 58 to lines 61 and 62. When the slide is properly positioned, switch SW2 connects lines 58 and 62, thereby completing the hot line circuit to various components of the selector circuit to be described. When the slide is improperly positioned, switch SW2 interrupts the hot line circuits to the various operating components and completes the circuit between lines 58 and 61 thereby energizing a slides status lamp 63 which becomes lighted indicating that the slide is improperly positioned, being extinguished upon returning the slide to its proper position.

The spacing or stepping solenoid $S_V$ is connected between the hot line 62 and the neutral line 65 emanating from the jack terminal 56(9) and is responsive to the momentary completion of the neutral line circuit, including line 65, to step the bit actuator carrier of the selector on a field-by-field basis. The particular manner in which the solenoid $S_V$ accomplishes this stepping is described in detail in the above cited Robert J. Kalthoff et al. copending application. The neutral line circuit to the spacing solenoid $S_V$ which includes line 65, is completed, as indicated previously, each time a numeric key 7, an alphabetic key 14, or the space key 13 is momentarily actuated. Thus, assuming that the circuit from the hot line 16 to the line 62 is complete, the bit actuator carrier will be stepped one character field each time a numeric key 7, an alphabetic key 14, or the space key 13 is actuated.

The tray positioning motor MT is connected directly to the hot line 62 via line 66 and to the neutral line 75 via line 70, normally open contacts 3–4 of relay R2, and line 71. The relay R2 is connected to the hot line 62 via line 66, the parallel circuit path of normally open contacts SW5(a) and normally closed contacts of tray actuated switch SW1(a), and line 73. The relay R2 is energized by completing the neutral line circuit from the jack terminal 56(9) via line 65, normally closed contacts 5–7 of relay R2, and line 74. The relay R2 latches through neutral lines 75 and 76, the parallel circuit path of normally open switch SW5(b) and normally closed tray actuated switch SW1(b), line 78, normally open contacts 6–8 of relay R2, and line 74.

In operation, assuming the tray is not in the upper position, the contacts of switches SW1(a) and SW1(b) are closed and the first completion of the circuit from neutral line 16 to line 65 will energize the relay R2 through the normally closed relay R2 contacts 7–5 and line 74. When the relay R2 becomes energized, the normally closed relay R2 contacts 7–5 open and the relay R2 latches through normally open relay R2 contacts 6–8 and normally closed switch contacts SW1(b). With relay R2 energized and latched, relay R2 contacts 3–4 close connecting neutral line 75, which is always connected to neutral line 17, to the motor MT via line 71, relay R2 contacts 3–4, and the line 70, thereby completing the neutral line circuit to the motor MT. With the neutral line 17, 75 connected to the motor MT in the manner indicated and the hot line 62 connected to the motor MT via line 66, the motor MT begins operation thereby raising the tray. Thus, if the tray is down, the first signal on line 65 will cause the tray motor MT to operate, raising the tray. When the tray has been raised to the proper position, the normally closed switches SW1(a) and SW1(b) are opened by suitable mechanical means actuated in response to the elevated position of the tray, interrupting, via switch SW1(b), one of the parallel latching circuits of relay R2 and one of the parallel hot line circuit paths, via switch SW5(a), to relay R2. The relay R1, and consequently the motor MT, do not become de-energized by the opening of normally closed switches SW1(a) and SW1(b) due to the closed condition of normally open switches SW5(a) and SW5(b). Switches SW5(a) and SW5(b) are mechanically tripped closed by the raising of the tray lift linkages at the beginning of the tray lift cycle and remain closed until the tray lift linkages are returned to their normally lowered position by the motor MT at the end of the tray lift cycle, thereby insuring that the tray motor and tray lift linkages are returned to their normal starting positions following a tray lifting cycle. However, when the tray lift linkages are returned to their normal positions, switches SW5(a) and SW5(b) open interrupting the remaining hot line and latching circuit paths to the relay R1, respectively. With these circuits interrupted, the relay R2 becomes de-energized and relay R2 contacts 3–4 open, interrupting the circuit between the neutral line 17, 71, 75 and the tray positioning motor MT, thereby de-energizing motor MT. Since the hot line 66, 73 to the relay R2 has been interrupted by the opening of normally closed switch SW1(b), subsequent energizatiton of the neutral line 65 in response to actuation of the space key 13, alphabetic key 14, or numeric keys 7 will be ineffective to energize the relay, and consequently, to energize the motor MT, the first signal on line 65 only being capable of energizing the relay R1 and motor MT.

The electromechanical bit actuators $S_a$–$S_e$ are connected to the hot lines 62 via line 79, line 100, normally closed contacts 1–2 of relay R3, and line 101. The electromechanical bit actuators $S_a$–$S_e$ are connected to the neutral line 17 via the neutral bus 25, bit keys 8, numeric keys 7 and alphabetic keys 14, lines 102–106, jack terminals 124(2)–124(6), jack terminals 56(2)–56(6), and lines 108–112.

In operation, the actuation of numeric keys 7 or alphabetic keys 14 energize pairs of bit actuators $S_a$–$S_e$ in accordance with the preferred two-out-of-five code. For example, the momentary actuation of alphabetic key 14E momentarily energizes bit actuators S$b$ and S$d$ setting rejection bars $b$ and $d$ in the character field of the selector corresponding to that which the console is addressed. The individual bit actuators S$a$–S$e$ may be selectively actuated by depressing one or more of the bit keys 8($a$)–8($e$). For example, actuation of bit key 8($a$) will energize bit actuator S$a$ setting selector rejector bar $a$ in the character field to which the console is addressed. Once the select key 12 has been actuated to initiate a searching operation, the bit actuators S$a$–S$e$ are disabled by the opening of normally closed contacts 1–2 of relay R3, interrupting the hot line circuit to the bit actuators, thereby preventing their oepration during the subsequent search of the cards. The bit actuators are enabled again when the relay R3 becomes de-energized by the opening of a platen motor actuated switch SW4, which interrupts the relay R3 latching circuit at the beginning of the operation cycle of the platen motor MP.

The platen motor MP is connected to the hot line 62 via lines 79 and 80 and to the neutral line 75 via normally open contacts 5–6 of relay R3, line 81 and line 82. The relay R3 is connected to the hot line via line 79 and to neutral line emanating from termnal 56(8) via line 83, normally closed contacts 9–10 of relay R3, and selected line 84.

In operation, a momentary completion of the circuit between neutral line 17 and select line 84 energizes the relay R3 via normally closed contacts 9–10 of the relay R3 and line 83. When the relay R3 becomes energized, contacts 9–10 of relay R3 open and the normally open contacts 7–8 of relay R3 close providing a latching circuit for the relay R3 through lines 83 and 86 and normally closed platen motor actuated switch SW4, line 87, neutral line 75, and relay contacts 5–6 of relay R3. With the relay R3 energized and latched, a circuit is completed from the neutral line 75 to the motor MP via line 81, contacts 5–6 of relay R3, and line 82, thereby energizing the motor MP.

When the platen motor MP becomes energized it begins operation moving the platen and rejection bars toward the sorting edges of the cards. Continued operation of the motor MP urges the platen carried bars against the cards, rejecting the undesired cards and lowering the tray. In addition, the lowering of the platen assembly is also accompanied by a return of the bit solenoid carrier to the first character field. Thereafter the platen is retracted by further operation of motor MP and when the motor MP has returned the platen to its normal position a switch SW4 is actuated by a motor shaft mounted cam, interrupting the latching circuit of relay R3, thereby causing relay R3 to become de-energized. The de-energization of relay R3 in turn causes contacts 5–6 of relay R3 to open interrupting the motor energization circuit and thereby de-energizing the motor MP. Thus, the platen motor MP, via cam operated switch SW4, is effective to cause its own de-energization upon return of the platen to its normal position.

The operation of the motor MP also functions to momentarily actuate, via suitable mechanical linkages and trips, a reset solenoid S$_R$ to thereby reset the rejection bars. The reset solenoid S$_R$ is connected to the hot line 62 directly and to the neutral line 17 via the contact 11A of the hold key, line 92 and platen motor controlled switch SW3. In operation the switch SW3 is mechanically cammed closed when the platen motor MP begins its cycle, completing an energization circuit to the reset solenoid S$_R$. The energization of the reset solenoid S$_R$ in turn actuates, via suitable mechanical linkages, rejection bar resetting means to thereby reset all the rejection bars. Upon the completion of the platen motor cycle, the switch SW3 again opens, de-energizing the reset solenoid S$_R$. The reset solenoid S$_R$ will not be energized by the closing of the switch SW3 if the hold key 11 is depressed inasmuch as the neutral line circuit to solenoid S$_R$ is interrupted by the open condition of contact 11A. Hence, actuation of hold key 11 disables the reset solenoid S$_R$.

CODER CIRCUITS

Figure 8:
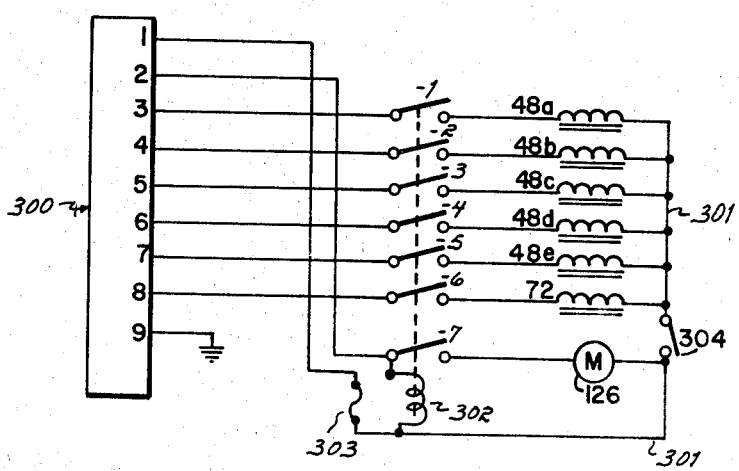
FIG. 8 is a schematic circuit diagram of a portion of the console control circuitry utilized in conjunction with the Simultaneous Keying and Notching Duplicating Coder.

The circuitry for operating the simultaneous keying and punching duplicating coder, the structure and operation of which are described in detail in Kalthoff et al. copending application for "Coder," Ser. No. 539,716, filed Apr. 4, 1966 is shown schematically in FIG. 8. The coder circuitry includes a terminal jack 300 having a plurality of terminals 300(1)–300(9) which in operation are connected to the correspondingly numbered jack terminals 125(1)–125(9) of the console circuit depicted in FIG. 5. Connected in parallel between a common hot line 301 and the respective neutral line terminals 300(2)–300(8) are the five bit solenoids 48($a$)–48($e$), the space solenoids 72 and the punch operating motor 126. The solenoids 48($a$)–48($e$) and 72 and motor 126 bear identical designations in the above mentioned Kalthoff et al. copending application entitled "Coder." The common line 301 is in turn connected to the hot line terminal 300(1) via a fuse 303 and to the neutral line terminal 300(2) via a coder relay 302. The coder relay 302, when energized by the actuation of the console coder key 10, closes the normally open contacts 302(1)–302(7) in series, respectively, with the five bit solenoids 48($a$) 48($e$), the space solenoid 72 and the punch motor 126 thereby conditioning the solenoids and punch motor for energization upon actuation of appropriate console keys. A switch 304 is connected in the common line 301 between the space solenoids 72 and the motor 126 which is mechanically tripped to disable the solenoids when the coder is operating in the duplicating mode, thereby preventing actuation of the solenoids should the operator inadvertently strike the space key or one of the alphanumeric keys.

Figure 9:
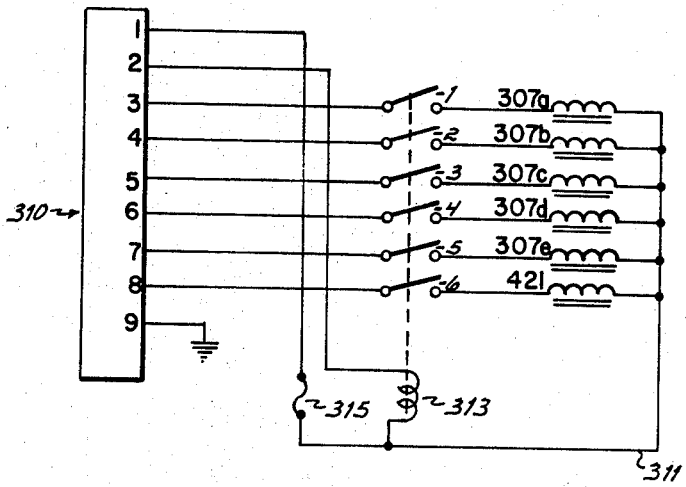
FIG. 9 is a schematic circuit diagram of a portion of the console control circuitry utilized in conjunction with the Nonduplicating Coder.

The circuitry for the non-duplicating coder, the coder structure and operation of which are described in more detail in the copending Kalthoff et al. application noted immediately above, is depicted schematically in FIG. 9. The non-duplicating coder circuitry includes a terminal jack 310 having a plurality of terminals 310(1)–310(9) which in use are connected to correspondingly numbered jack terminals 125(1)–125(9) of the console circuit shown in FIG. 5. Connected in parallel between a common hot line 311 and the respective neutral line terminals 310(2)–310(8) are the bit solenoids 307($a$)–307($e$), the space solenoid 421, and the coder solenoid 313. The solenoids 307($a$)–307($e$) and 421 bear identical designations in the above mentioned Kalthoff et al. application entitled "Coder." The coder solenoid 313, when actuated in response to the depression of the coder key 10 of the console, operates to close normally open coder contacts 313(1)–313(6), which are in series respectively, with the solenoids 307($a$)–307($e$) and 421 thereby conditioning the solenoids for energization by actuation of the appropriate console keys. The common line 311 in turn is connected to the hot line terminal 310(1) via a fuse 315. Unlike the other coder embodiments described in the above noted copending Kalthoff et al. application, no motor is provided in this non-duplicating coder embodiment inasmuch as the bit solenoids 307($a$)–307($e$) actuate the site notching punches directly. This mode of actuation is in contradistinction to the duplicating coders in which the bit solenoids set memory fingers which, upon sensing by suitable sensing means, serve to couple a motor to the notching punch thereby notching the desired notch sites.

Figure 10:
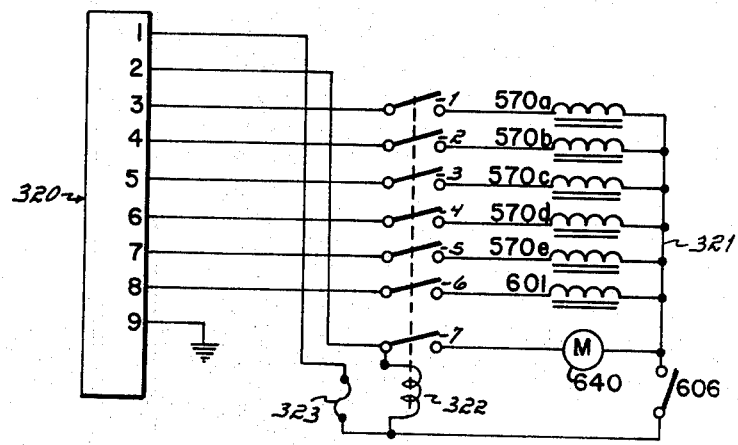
FIG. 10 is a schematic circuit diagram of a portion of the console control circuitry utilized in conjunction with the Sequential Keying and Notching Duplicating Coder.

In FIG. 10, suitable circuitry is shown for operating the sequential keying and punching duplicating coder, the coder structure and operation being described in greater detail in the above noted copending Kalthoff et al. application. This circuit includes a terminal jack 320 having a plurality of terminals 320(1)–320(9) which are connected in practice to correspondingly numbered terminals 125(1)–125(9) of the console circuit shown in FIG. 5. Connected in parallel between the terminals 320(2)–320(8) and a common line 321 are the bit solenoids 570(a)–570(e), the space solenoid 601, and the motor 640. The common line 321 is in turn connected to the hot line terminal 320(1) via a switch 606 and a fuse 323. A coder relay 322, connected between the neutral terminal 320(2) and the junction of the fuse 323 and switch 606, when energized in response to the actuation of the coder key 10 located on the console and shown in FIG. 5, closes the normally open contacts 324(1)–324(7) in series with the solenoids 570(a)–570(e) and 601 and the motor 640, completing energizing circuits to the bit and space solenoids 570(a)–570(e) and 601 and the motor 640, thereby conditioning the solenoids and the motor for energization upon actuation of the appropriate keys of the console. The switch 606 is provided to disable the bit solenoids 570(a)–570(e), space solenoid 601 and motor 640 when the coder carriage is positioned in the leftmost position following a keying or notching operation. The solenoids 570(a)–570(e), 601, motor 640 and switch 606 bear identical designations in the above mentioned Kalthoff et al. copending application entitled "Coder."

SELECTOR CIRCUIT OPERATION

The operation of the general purpose console will first be discussed in conjunction with its use to search a bank of sixteen selector units, the choice of the number of units being arbitrary. In practice, the terminals jack 124 of the console are connected in parallel to each of the jacks 56 of the selector units, one of which is depicted in FIG. 6. In addition, the jacks 40 of the selector units are connected to different ones of the sixteen output terminals 123(1)–123(16) of the console jack 123. With the above connections made and the jack 15 of the console connected to a suitable power supply, the selector units are ready to be searched under the control of the console unit.

To initiate the searching operation, it is first necessary to depress the on-off key 9. This connects the hot line 16 to the relays 26 and 27 via bus 24, the normally closed contacts of key 6 (18), contact 10C of key 10, line 30, and line 126. It also connects the hot line 16 to the stepping mechanism 23 via bus 24, contact 9A of key 9, and line 29, and to the various operating components of the selector via bus 24, the normally closed contacts of key 6(18), contact 10C of key 10, line 30, line 126, terminals 124(7) and 56(7), and line 55.

The above connections of the hot line 16 obtain providing that the reset key 6(18) and the coder key 10 have not been depressed, which is the case when the console is to be operated in the select, or search, mode.

With power applied to the console unit by the depression of the on-off key 9, the console status lamps 4, which are connected in parallel across the output terminals 21 and 22 of the transformer 20 via contact 9B of key 9, become lighted indicating that the console is energized. In addition, lamp 5(1), which is connected across the transformer terminals 21 and 22 via contact 9B of key 9 and movable arm 36, become lighted indicating that the character stepping device 23 is positioned at the first character field, the character stepping device 23 having been reset to the first character field upon the depression of the select key 12 during the previous searching operation. If, for some reason, the character stepping device 23 is not positioned at the first character field, the character stepping device 23 may be reset by simply depressing the select key which energizes the reset winding 39. Finally, unless the coder key 10 has been depressed, the select lamp 132, which is connected across the transformer terminals 21, 22 via contact 10D of key 10 and contact 9B of key 9, becomes lighted indicating that the console is in the select or search mode.

Having energized the console and connected the hot line 16 to the selector units, it is next necessary to enable or condition the selector units which are to be searched. For example, if it is desired to search Selector Unit 1, then the selector key 6(1) is momentarily derpressed completing a circuit from the neutral line 17 to the main latching relay R1 of Selector Unit 1 including bus 25, jack terminals 123(1) and 40, and line 54, thereby completing the energization circuit for relay R1. Relay R1 becomes energized closing normally open relay contacts 2–4 and 5–6 and thereby latching relay R1 through lines 127, 75 and completing the hot line circuit 55, 53, 58 to the remainder of the circuit components of the selector, respectively. With the hot line circuit so completed the selector status lamp 57 becomes lighted innicating that Selector Unit 1 has been enabled. In addition, and providing the slide is properly positioned, the switch SW2 further completes the hot line circuit 55, 53, 58 to the line 62 thereby completing the hot line circuit to the tray motor MT, platen motor MP, reset solenoid $S_R$, bit solenoids $Sa$–$Se$, and relays R2 and R3. If the slide is not properly positioned, slide actuated switch SW2 is not in the position shown in FIG. 6, the circuit from line 58 to 62 is interrupted, and the slide status light 63 is energized via completed hot line circuit 58, 61 indicating that the slide is improperly positioned. By properly positioning the slide, the switch SW2 transfers to the position shown in FIG. 6, extinguishing the slide status lamp 63 and completing the hot line circuit from line 58 to line 62 thereby applying power to the remaining selector components indicated previously.

If other selector units are to be enabled or conditioned for searching, the appropriate selector keys 6 associated with the desired selectors are momentarily depressed producing in the desired selector units the same results as produced in the selector unit depicted in FIG. 6 and discussed immediately above. Similarly, if all of the selector units are to be enabled or conditioned for searching, the all key 6–17 is momentarily depressed producing in all of the selector units the energization conditions produced in the selector circuit of FIG. 6, which are discussed above.

The next step for searching involves the sequential entry, into the appropriate character fields, of the coded characters which are to be searched. This is achieved by the sequential actuation of the appropriate numeric and alphabetic keys 7 and 14. For example, if it is desired to enter the alphabetic character "E" into the first character field, the alphabetic key 14(E) is momentarily actuated. The momentary actuation of the alphabetic key 14(E) accomplishes a variety of results. First, a circuit from the neutral line 17 to the selector $b$ and $d$ lines 109 and 111, respectively, is completed via bus 25, console lines 103 and 105 and console jack terminals 124(3) and 124(5), and selector jack terminals, 56(3), 56(5), energizing the bit solenoids $Sb$ and $Sd$, thereby setting the selector rejection bars of the first character field corresponding to the $b$ and $d$ bits. The $b$ and $d$ lines 109 and 111 are energized because the two-out-of-five code for the character "E" corresponds to bits $b$ and $d$. Secondly, the actuation of the alphabetic key 14E completes a circuit via lines 120 and 28 from the neutral line 17 to the stepping winding 38 of the character field stepping device 23 causing the movable contact 36 to advance from position 1 to position 2, extinguishing the lamp 5(1) and lighting the lamp 5(2), thereby indicating that the console is addressed to the second character field.

Thirdly, the actuation of the alphabetic key 14(E) completes a circuit between the neutral line 17 and the space line 65 of the selector unit via line 120 and jack terminals 124(9) and 56(9), producing a two-fold effect in the selector circuit. The first of these effects is to complete an energization circuit via line 130 to the spacing solenoid $S_V$ causing the bit solenoid carrier in the selector unit to be advanced to the next succeeding field, that is, to the second character field. The second of these effects is to complete an energization circuit through normally closed relay R2 contacts 5–7 thereby energizing relay R2. Relay R2, when energized, closes normally open relay contacts 6-8 latching the relay through normally closed switch SW1(*b*) and closes normally open relay contacts 3-4 completing an energization circuit via lines 75, 71 and 70 to the tray motor MT causing the motor MT to operate for a cycle raising the tray to the proper position. As described earlier when the tray motor MT has completed positioning the tray in the upper position, the normally closed switches SW1(*a*) and SW1(*b*) are mechanically cammed open. The opening of switch SW1(*a*) interrupts one of two hot line circuits including lines 66 and 73 to the relay R2, the relay R2, however, remaining energized via an alternate hot line path through switch SW5(*a*) which is closed when the motor MT raises the tray. The opening of the switch SW1(*b*) interrupts one of two parallel latching circuits for the relay R2, the relay R2 remaining energized via an alternate path through SW5(*b*) which is closed when the motor MT raises the tray. Until the motor MT lowers the tray lifting linkages to their normal position, the motor MT remains energized via switches SW5(*a*) and SW5(*b*). Motor MT is de-energized when switches SW5(*a*) and SW5(*b*) open the hot line and latching circuit to the relay R2, de-energizing the relay which in turn interrupts the neutral line circuit to the motor MT, de-energizing the motor MT. Until the tray is again lowered, closing switches SW1(*a*) and SW1(*b*), the motor relay R2 is disabled inasmuch as its hot line is interrupted and consequently the motor MT is also disabled. Thus, until the tray is lowered, signals on line 65 are ineffective to operate motor MT. As will be described later, the tray is lowered conditioning the relay R2 and motor MT during the selecting phase of the searching operation, that is when the platen motor MP is operated to reject the undesired cards.

Having keyed in the first character to be searched and having set the appropriate rejection bars of the first character field of the selector unit, the second character is keyed into the console. This is accomplished in a similar manner by momentarily actuating the desired numeric or alphabetic key 7 or 14. For example, if it is desired to key in the number "1" into the second character field, the numeric key 7-1 is momentarily actuated. This actuation completes a circuit, via bus 25, lines 102, 103 and jack terminals 124(2), 124(3), 56(2), 56(3) from the neutral line 17 to the selector *a* and *b* lines 108 and 109, respectively, completing energization circuits to the *a* and *b* bit solenoids S*a* and S*b*, respectively, thereby setting the *a* and *b* rejection bars of the second character field of the selector. The *a* and *b* bits correspond to the two-out-of-five code for the number "1."

The momentary actuation of the numeric key 7(1) has the further effect of completing a neutral line circuit between the neutral line 17 and the stepping winding 38 including lines 120, 28 thereby energizing the winding 38, advancing the movable arm 36 to the third character field, lighting the lamp 5(3) and extinguishing the lamp 5(2). Key 7(1) also completes a circuit from neutral line 17 to line 65 via lines 120 and jack terminals 24(9) and 56(9). The energization of line 65 energizes the space solenoids $S_V$, advancing the selector bit solenoid carrier to the third character field. The momentary completion of the line 65 is ineffective, however, to energize relay R2 via normally closed relay contacts 5-7 due to the interruption of the hot line 73 caused by the opening of normally closed switch SW1(*a*) of relay R2 during the previous character entry operation.

In like manner, the characters for the remaining character fields 3-13 are entered, and the appropriate coded pairs of rejection bars set in the corresponding character fields of the selector units. It is also noted that during the entry of characters into the remaining character fields neither of the two relays R2 and R3 is energized, that neither of the two motors MP or MT is operating, that reset solenoid $S_R$ is inoperative, and that switches SW2, SW3, SW4 and SW5 are in the condition shown in FIG. 6. However, relay R1 is energized and latched, completing the hot line circuit 55, 58, and the switches SW1(*a*) and SW1(*b*) are open disabling relay R2 and motor MT.

If instead of entering characters into all of the remaining fields, one or more fields are to be skipped, the space key 13 is actuated for the respective fields in which no entry is to be made. The actuation of the space key 13 completes a circuit via line 28 to the stepping winding 38 advancing the console character stepping mechanism 23 to the next field. In addition, the space key 13 also completes a circuit to the selector stepping solenoid $S_V$ via line 120, terminals 124(9) and 56(9) and lines 65 and 130 advancing the bit solenoid carrier one field.

When all the desired characters have been keyed into the console and the associated rejection bars of the selector properly positioned, the searching operation is initiated by momentarily depressing the select key 12. The depression of the select key 12 completes a circuit via bus 25 and lines 32, 34 from the neutral line 17 to the reset winding 39 of the character stepping device 23 causing the movable arm 36 to be reset to the first character field and thereby become readied for the next character code entry operation. In addition, the momentary operation of the select key 12 also completes a circuit via bus 25, line 32, and jack terminals 124(8) and 56(8) from the neutral line 17 to the select line 84 in the selector. The completion of the circuit to the line 84 energizes the relay R3 through the normally closed relay contacts 9-10 and line 83, energizing relay R3 and closing normally open relay contacts 7-8 and 5-6 and opening normally closed relay contacts 9-10 and 1-2. The closing of relay contacts 7-8 latches the relay through normally closed switch SW4 and lines 83, 86 and 87. The opening of normally closed relay contacts 1-2 interrupts the hot line circuit 100, 101 to the bit solenoids S*a*-S*e*, disabling the bit solenoids. The closing of relay contacts 5-6 completes an energization circuit via lines 75, 81 and 82 to the platen motor MP energizing this motor. The energization of the platen motor MP returns the bit solenoid carrier to the first character field and urges the rejection bars against the sorting edges of the cards rejecting those cards having code notched edges not conforming with the characters previously keyed into the console.

The urging of the rejection bars against the sorting edge of the card in response to operation of the select motor MP also causes the tray to be lowered and the normally closed switches SW1(a) and SW1(b) to be closed thereby conditioning the relay R2, and hence the motor MT, for energization the next time a signal is present on line 65. The motor 52, when it has completed its cycle, that is, rejected the cards, lowered the tray, and returned the platen again to its raised, normal position, is de-energized by the opening of the normally closed switch SW4 which interrupts the latching circuit to the relay R3 thereby de-energizing relay R3. In turn, the de-energization of relay R3 interrupts the energization circuit through relay R3 contacts 5-6 to the motor MP causing the motor MP to become inoperative. It will be remembered that switch SW4 is mechanically closed by the motor MP at the beginning of the motor cycle and opened by the motor at the end of the motor cycle.

The operation of the platen motor MP has the additional indirect effect of sequentially closing and opening switch SW3. The momentary closing of switch SW3 completes an energization circuit via line 92 to the resetting solenoid $S_R$ which, providing the solenoid $S_R$ is not disabled by the prior actuation of the hold key 11, returns the set rejection bars to their normal, reset position. If the hold key 11 has been actuated, the rejection bars of the selector will not be reset.

As indicated previously, in the event that it is desired to retain in the selector unit those characters already entered into the console, the hold key is depressed prior to the actuation of the select key 12. The actuation of the hold key 11 is effective to interrupt the circuit between the neural line 17 and the hold line 92 thereby disabling the rejection bar resetting solenoid $S_R$. Hence, when the select key 12 is depressed to initiate the searching operation, the solenoid $S_R$ will not be indirectly rendered operative by the operation of the motor MP and those rejection bars set during the character keying operation will remain set. In certain instances, as previously noted, it may be desirable to so disable the rejection bar resetting motor $S_R$. For example, it may be necessary or desirable to first conduct a preliminary search of the selector unit using less than all of the thirteen character fields. Following this preliminary search, the desired characters are entered into the remaining character fields and the searching operation again initiated. By not resetting the rejection bars following the preliminary search, the second search is conducted without having to once again key into the console the characters previously entered prior to the preliminary search.

If it is desired to set the rejection bars of the selector units in a manner other than in accordance with the numeric and alphabetic keys 7 and 14, which are coded using a conventional two-out-of-five code, the bit keys 8(a)–8(e) may be utilized instead of the numeric and alphabetic keys 7(1)–7(0) and 14(A)–14(YZ). However, when utilizing the bit keys 8(a)–8(e) to set the various rejection bars of the character fields, it will be necessary to advance and reset the character stepping device 27 of the console and the bit solenoid carrier of the selectors, by periodically depressing the space key 13. The operation of the console and the selectors, except for the stepping and resetting aspect, is no different than if the numeric and alphabetic keys 7 and 14 were utilized to set the rejection bars of the various character fields. For example, actuation of the bit key 8(a) completes a neutral line circuit to bit solenoid Sa, energizing the solenoid and setting the a bar of the character field to which the console is addressed. Similarly, actuating one or more of the remaining unactuated bit keys 8(b)–8(e), sets one or more of the remaining unset bars b–e.

CODER CIRCUIT OPERATION

The operation of the console to control the various embodiments of the coder will now be discussed. In practice, the terminals of jack 125 of the console are connected to the correspondingly numbered terminals of the coder jacks 300, 310 or 320, depending upon which one of the coder embodiments is being operated at the time. Assuming first that the terminals of the console jack 125 are connected to the terminals of the coder jack 300, that is, that the console is being utilized in conjunction with the simultaneous keying and punching duplicating coder circuit of FIG. 8. Coder operation is initiated by depressing the on-off key 9 and the coder key 10.

Actuation of the coder key 10 conditions the coder by completing the neutral line circuit via contact 10A of key 10. In addition, actuation of the coder key 10 disables the selectors as well as the relays 26 and 27 by interrupting the hot line 30, and extinguishes the indicator lamps 131 and 132 while lighting the lamp 130 thereby indicating that the console is in the coder mode.

Actuation of the on-off key also completes a circuit from the hot line 16 to the relay 302, motor 126 and solenoids 48(a)–(e) and 72 via the hot bus 24, contact 9B of on-off key 9, line 29, and terminals 125(1). The completion of the hot line circuit to the relay 302 energizes this relay, closing contacts 302(1)–302(7), thereby conditioning the solenoids 48 and 72 and the motor 126. A circuit is also completed from hot line 16 to the character stepping device 23 windings 38, 39 via line 29. In addition to completing the hot line circuit to the coder and console stepping device 23, depression of the on-off switch 9 also completes a circuit from the line 21 of the transformer to the console status lamps 4 lighting these lamps and thereby indicating the operative status of the console. Contact 9B of on-off switch 9 also completes a circuit to the first field indicator lamps 5(1) via the movable arms 36, which has been reset to the terminal 37(1) of the stepping switch 23 as a consequence of the previous selection or coding process, lighting lamp 5(1) and thereby indicating that the console is addressed to the first character field.

Having energized the console and coder and disabled the selectors by the joint actuation of the on-off key 9 and the coder key 10, the simultaneous keying and notching operation may be initiated by depressing the desired bit, or alphabetic numeric keys 7, 8, or 14 as the case may be. For example, if it is desired to enter the character "A" into the first character field, the key 14(A) is depressed. The actuation of the key 14(A) completes the neutral line circuit to the conditioned bit solenoids 48(a) and 48(b) momentarily energizing solenoids 48(a) and 48(b). The momentary energization of the solenoids 48(a) and 48(b) actuates suitable associated linkages in the simultaneous keying-notching duplicating coder thereby setting the a and b memory fingers in the first character field of the coder memory unit and causing the notching of the a and b notch sites in the first character field of the card, in a manner described in detail in the above noted copending application to Robert J. Kalthoff et al. for "Coder."

The actuation of the key 14(A) also serves to complete a circuit to the console stepping winding 38 via the lines 120 and 28 advancing the console character stepping mechanism 23 to the next succeeding field and lighting the console character field indicator lamp 5(2). In addition, a circuit is completed, via line 120 and terminals 25(8) and 300(8), to the coder stepping solenoid 72 momentarily energizing this solenoid to advance the coder carriage to the next successive character field, that is, to the second character field.

If in the second character field the letter "E" is to be entered, the key 14(E) is actuated. The actuation of this key completes an energization circuit to the bit solenoids 48(b) and 48(d) via the neutral lines 103 and 105, terminals 124(3) and 124(5) and 300(3) and 300(5), energizing the solenoids 48(b) and 48(d). The monetary actuation of the solenoids 48(b) and 48(d) is effective to set the b and d memory fingers in the second character field of the coder memory unit causing the notching of the b and d sites in the second character field of the card. The actuation of the alphabetic key 14(E) is also effective to step the console stepping mechanism 23 and the coder carriage to the next or third character field in a manner similar to that described with respect to the actuation of the alphabetic key 14(A) discussed above.

Numeric characters may be entered into the character fields with similar ease by actuation of the numeric keys 7(1)–7(0). For example, if the number "3" is to be entered into the third character field, the numeric key 7(3) is actuated. The actuation of the key 7(3) completes the neutral line circuit to the solenoids 48(b) and 48(c) via the lines 103 and 104, terminals 125(3), 125(4) and 300(3), 300(4), energizing the solenoids 48(b) and 48(c). The solenoids 48(b) and 48(c) when energized, set the b and c memory fingers in the third character field of the memory unit, causing the notching of the b and c sites of the third character field of the card. The actuation of the numeric key 7(3) also completes an energization circuit to the console stepping relay 38 and coder stepping solenoid 72, lighting the console indicator lamp 5(4) of the console and advancing the coder carriage to the fourth character field. In a similar manner, further entries of numeric and alphabetic characters may be made in the remaining character fields 4–13 by actuation of the desired ones of the keys 7 and 14.

If, instead of entering alphabetic or numeric characters into the character fields, it is desired to notch the sites of a character field in accordance with a code different from the preferred "two-out-of-five" code described previously, the bit keys 8(a)–8(e) may be actuated. For example, if in the fourth character field it is desired to 570(d) via associated mechanical linkages sets the b and d memory fingers of the first character field of the coder memory. In addition, the actuation of the key 14(E) also completes neutral line circuits to the console stepping winding 38 and the coder stepping solenoid 601, advancing the console character stepping mechanism 23 and the coder carriage to the second character field.

Into the second character field, for example, may be entered the numeric character "8" by actuating the numeric key 7(8). The actuation of this numeric key completes neutral line circuits to the coder bit solenoids 570(b) and 570(e) resulting in the energization of these bit solenoids. The energization of these bit solenoids 570(b) and 570(e), via suitable mechanical linkages sets the b and e memory fingers of the second character field of the coder memory. In addition, the actuation of the numeric key 7(8) also completes neutral line circuits to the console stepping mechanism 23 and the coder stepping solenoid 601 advancing the console character stepping mechanism 23 and the coder carriage to the third character field.

In the third character field it is possible, in a like manner, to enter alphabetic or numeric characters as well as individual bits in accordance with the desires of the user. For example, if the bit d is desired to be entered into the third character field it is necessary to actuate the bit key 8(d). The actuation of bit key 8(d) completes a circuit to the coder bit solenoid 570(d) energizing this solenoid which, through suitable mechanical linkage, sets the d memory finger of the third character field of the coder memory. Since the actuation of a bit key 8 is not accompanied by automatic stepping of either the character stepping mechanism 23 or the coder carriage, it is necessary, in order to advance the console character stepping mechanism 23 and the coder carriage to the next successive field, to momentarily actuate the space key 13. The space key 13, when actuated, completes neutral line circuits to the console stepping winding 38 and the coder stepping solenoid 601, advancing the character stepping mechanism 23 and the coder carriage to the fourth successive field.

The entry of characters or bits into the remaining character fields 4–13 is effected in a manner similar to that described. Upon character entry or the leaving blank of the remaining character fields 4–13, card notching is effected, in a manner described in detail in the above noted copending application to Kalthoff et al. for "Coder," by returning the coder carriage to the extreme right-hand position and releasing it whereupon the memory fingers set previously in response to the console keying operation are sensed and the appropriate sites notched in the character fields of the card. When the carriage has advanced to the extreme left position completing the card notching operation, the normally closed switch 606 is actuated, and the circuit to the motor 640 and the solenoids 570 and 601 is interrupted de-energizing the motor 640 and solenoids 570 and 601.

Figure 14:
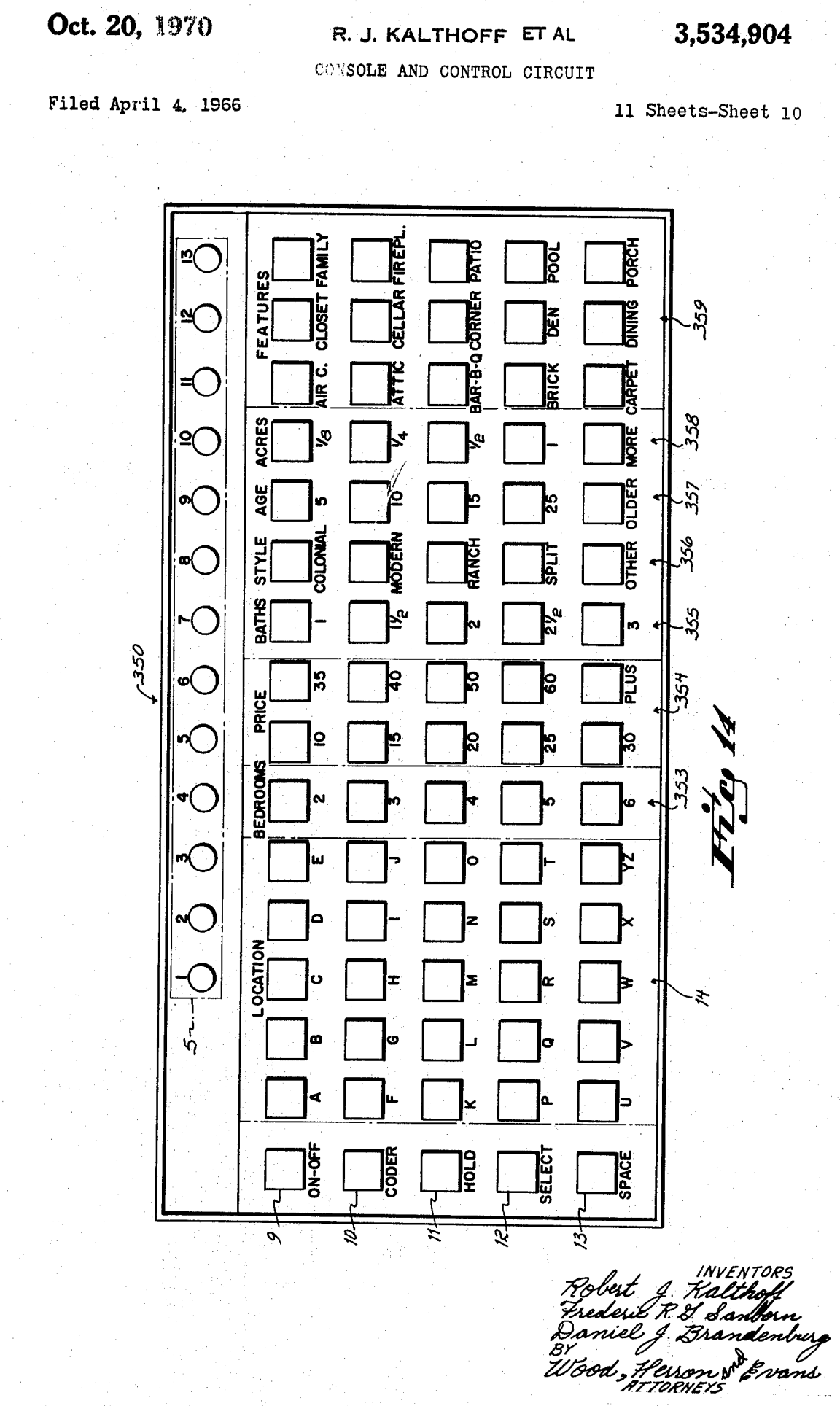

A special purpose keyboard 350 for use in a real estate operation is depicted in FIG. 14. The keyboard 350 has five function keys 9–13 corresponding to the five functions previously described with respect to the general purpose keyboard, namely, on-off, code, hold, select and space. Since the function keys of the special purpose console keyboard are electrically connected in a manner identical to the function keys of the general purpose console, the special purpose console function keys will not be discussed further. The keyboard 350 has a set of alphabetic keys 14 for entering into fields 1–3 the three letters corresponding to the "location" feature, for example I, N, H for the location "Indian Hill." The alphabetic keys upon actuation generate binary signal pairs coded in accordance with the two-out-of-five code described in the copending Robert J. Kalthoff et al. application for "Data Retrieval Apparatus and Method," filed Apr. 4, 1966, Ser. No. 539,716, now issued Pat. 3,450,261. Additionally, the alphabetic keys upon actuation step the console and coder or selector stepping mechanism to the next character field. The alphabetic keys 14 of FIG. 14 are connected in a manner similar to the alphabetic keys 14 described earlier respecting the general purpose console.

The keyboard 350 also contains a group of five bedroom keys 353, ten price keys 354, five bath keys 355, five style keys 356, five age keys 357 and five acre keys 358. Since the keys of each of these groups represent mutually exclusive home characteristics, each key when actuated, in addition to completing circuits to a bit or pair of bit solenoids depending on the coding scheme used, also completes circuits to the console and coder or selector stepping mechanisms advancing them to the next character field. The keyboard further includes fifteen feature keys 359, which do not represent mutually exclusive classes since it is possible to have a house with more than one of the features. Since the features of keys 359 are not mutually exclusive, actuation of one or more of these keys does not automatically advance the character field stepping devices of the console and coder or selector to the next successive field. Such stepping is accomplished by actuation of the space key 14. The various groups of keys 353–359 may be colored with contrasting colors to simplify the operation and reduce the chances of an operator actuating a key from the wrong column.

The keyboard also includes a set of thirteen character field indicating lamps 5(1)–5(13). The first three lamps 5(1)–5(3) are correlated with the "location" feature of a home. The remaining lamps 5(4)–5(13) are correlated, respectively, with the vertical columns of keys beneath the lamps.

In operation, assume a prospective home buyer desires to find a five year old ranch-type house selling for $50,000 which is located in Indian Hill and has three bedrooms, three baths, one acre of land, air conditioning, carpeting, a cellar and attic, and a pool. The realtor, in attempting to find such a house, would actuate the I, N and H alphabetic keys entering these letters into "location" fields 1–3, the console and selector advancing successively to fields 2, 3 and 4 in response to the entry of the three letters identifying the location. The realtor would then energize the appropriate key in the bedroom column since lamp 5(4) is lighted indicating that the console and selector are ready for an entry in field 4. Since the realtor is interested in a three bedroom home, the key labeled 3 is actuated. Upon the actuation of the 3 key, the console and selector automatically step to field 5 since the bedroom feature is mutually exclusive, one house having but a single number of bedrooms. In the fifth field prices ranging from $10,000 to $30,000 can be entered by depressing the appropriate one of the keys labeled 10 to 30, respectively. However, since in the assumed example, the buyer is interested in a $50,000 home, no entry is made in this field and the space key 13 is depressed, advancing the console and selector to the second group of price keys located under lamp 5(6) which is now lighted indicating that an entry can be made in field 6. In field 6, the key labeled 50 is actuated entering the $50,000 price feature, whereupon the console and selector automatically advance to the next field, the entries possible in field 5 being mutually exclusive. In like manner, keys labeled 3 in the bath column, "ranch" in the style column, 5 in the age column, and 1 in the acre column are actuated as the lamps 5(7)–5(10) become successively and automatically lighted indicating that the various fields 7–10 are ready for entries selected from the groups of keys 355–358 correlated with the fields 7–10, respectively.

Having made an entry in field 10, the console and coder are now ready for entries in fields 11–13. Since the entries possible in any of fields 11–13 are not all mutually exclusive, automatic field advancing does not occur each time a feature key is depressed. Therefore, it is possible to actuate one or more keys in a given features column. In the example considered herein, keys labeled "air–c,"

notch site *a*, the key 8(*a*) is actuated completing a neutral line circuit to the bit solenoid 48(*a*), resulting in the setting of the *a* memory finger of the fourth character field of the memory as well as the notching of the *a* site of the fourth character field of the card. If it is desired to notch one or more of the remaining unnotched sites in the fourth character field of the card, the desired key or keys 8(*b*)–8(*e*), corresponding to the unnotched sites of the fourth character field, are actuated either serially or concurrently completing circuits to the corresponding solenoids 48(*b*)–48(*e*) thereby causing the setting of the memory fingers and the notching of the sites in accordance with bit key or keys 8(*b*)–8(*e*) which were actuated.

Upon completion of the memory finger setting and site notching cycle for the fourth character field, the console and coder are stepped to the fifth character field by momentarily actuating the space key 13 completing circuits to the space solenoid 72 and the console stepping winding 38 advancing both the console stepping mechanism 27 and the coder carriage. It is noted that while automatic console and coder stepping accompanies the entry of alphabetic and numeric characters into the coder, this is not true when one or more of the bit keys 8(*a*)–8(*e*) are actuated. Thus, whenever notch sites are notched using the bit keys 8(*a*)–8(*e*), the space key 13 must be actuated to advance the stepping mechanisms of the coder and consoles to the next successive field.

The space key 13 is also actuated whenever no entry is desired in a character field. For example, if no entry is desired in the fifth character field, the space key 13 is actuated completing a circuit to the console stepping winding 38 and coder stepping solenoid 72 thereby advancing the console stepping mechanism 23 and the coder carriage to the sixth character field.

The operation of the memoryless non-duplicating coder having the circuit shown in FIG. 9 is similar to that of the previously described coder except for certain minor operational details to become evident hereafter. The non-duplicating coder is readied for operation by depressing the on-off key 9 and the coder key 10, thereby conditioning the coder and console in the manner discussed previously with respect to the description of the simultaneous keying and notching duplicating coder circuit shown in FIG. 8. The entry of alphabetic and numeric characters as well as individual bits into the character fields of the card is also accomplished in a manner similar to that described with respect to simultaneous keying and notching duplicating coder. Specifically, by depressing selected ones of the numeric, alphabetic, or bit keys 7, 14 or 8, as the case may be, numeric characters, alphabetic characters, or individual bits may be notched on the card.

For example, if the character "G" is to be entered into the first character field, the key 14(G) is depressed. The depression of this key completes an energization circuit to the bit solenoids 307(*a*) and 307(*e*) via the lines 102 and 104, terminals 125(3) and 125(5) and terminals 310(3) and 310(5). The bit solenoids 307(*a*) and 307(*e*) when their energization circuits are completed, become energized and, via suitable mechanical linkages, reciprocate their associated notching punches producing notches at the notch sites *a* and *e* of the first character field of the card. The actuation of the key 14(G) is also effective to complete a neutral line circuit to the console stepping winding 38 via lines 120 and 28 to advance the console character field stepping mechanism 23 to the second character field. The key 14(G) when actuated, in addition, is effective to complete the neutral line circuit to the coder stepping solenoid 421 via line 120, and terminals 125(8) and 310(8), momentarily energizing this solenoid to advance the coder carriage to the second character field.

If in the second character field, the numeric character "9" is to be entered the key 7(9) is actuated completing circuits to the solenoids 307(*c*) and 307(*e*), energizing these solenoids, and actuating mechanically associated notching punches to notch the sites *c* and *e* of the second character field of the card. In addition, the actuation of the key 7(9) completes a circuit to the console stepping winding 38 to advance the console character stepping mechanism 23 to the third character field, and completes a circuit to the coder stepping solenoid 421 to advance the coder carriage to the third character field.

In addition to alphabetic and numeric characters, it is also possible to selectively notch the notch sites of the character fields of the cards in accordance with some code other than the preferred "two-out-of-five" code. For example, if in the third character field, it is desired to notch only the *e* notch site, then the bit key 8(*e*) is actuated. The actuation of the bit key 8(*e*) completes a circuit to the *e* bit solenoid 307(*e*). When the energization circuit to the solenoid 307(*e*) is completed, the solenoid 307(*e*) is actuated and, via associated mechanical linkages, reciprocates the corresponding punch to notch the *e* notch site of the card. If one or more of the remaining unnotched sites are to be notched in the third character field the remaining bit keys 8(*a*)–8(*d*) can be selectively actuated, producing results analogous to those produced by the actuation of the bit key 8(*e*). When it is desired to advance the console character stepping mechanism 23 and the coder carriage to the next successive field subsequent to a bit key actuation, the space key 13 is actuated. The actuation of the space key 13 completes neutral lines circuits to the console stepping winding 38 to thereby advance the console character stepping mechanism 23 to the fourth character field, and additionally completes a circuit to the coder stepping solenoid 421 advancing the coder carriage also to the fourth character field.

In the fourth character field it is again possible to enter either alphabetic or numeric characters as well as individual bits or to make no entry at all. If no entry is desired, the space key 13 is actuated to advance the console stepping mechanism 23 and coder carriage to the fifth character field in a manner described previously.

The remaining character fields 5–13 may be coded or left blank by depressing the appropriate alphabetic keys 13, numeric keys 7, bit keys 8, or the space key 13, as desired.

Like the two previously described coders, the sequential keying and notching duplicating coder having the circuit of FIG. 10 is readied for operation by depressing the on-off key 9 and the coder key 10. The actuation of the key 9 completes the hot line circuit through the terminal 320(1) to the coder relay 322 which, when energized by the actuation of the coder key 10, closes the contacts 322(1)–322(7). The closure of these contacts in turn completes a portion of the neutral line circuits to the solenoids 570(*a*)–570(*e*), space solenoid 601 and motor 640. The actuation of the coder key 10 completes a neutral line circuit to the motor via the contacts 322(7). Assuming the coder carriage is located at the first character field, the switch 606 will complete the energization circuits to the motor 640, energizing the motor only, energization circuits to the solenoids 570 and 601 not being completed until the appropriate console keys are actuated.

With the coder carriage located at the first character field, and the console addressed to the first character field by reason of the movable arm 36 of the console character stepping mechanism 23 being in contact with terminal 37(1). the console and coder are readied for character entry. Both alphabetic and numeric characters as well as individual bits may be entered into the various character fields by the depression of the keys 14, 7 and 8, as the case may be. For example, if the character E is to be entered into the first character field, the key 14(E) is depressed completing neutral line circuits to the coder bit solenoids 570(*b*) and 570(*d*) energizing these solenoids. The energization of the solenoids 570(*b*) and "attic" and "carpet" are actuated in the column under lighted lamp 5(11), whereupon the space key 13 is depressed to advance the console and selector to the next successive field, that is, to field 12. In field 12, the "cellar" key is actuated followed by actuation of space key 13 to thereby advance the console and selector to field 13. In field 13, the "pool" key is actuated, completing the entry phase of the retrieval operation.

Figure 15:
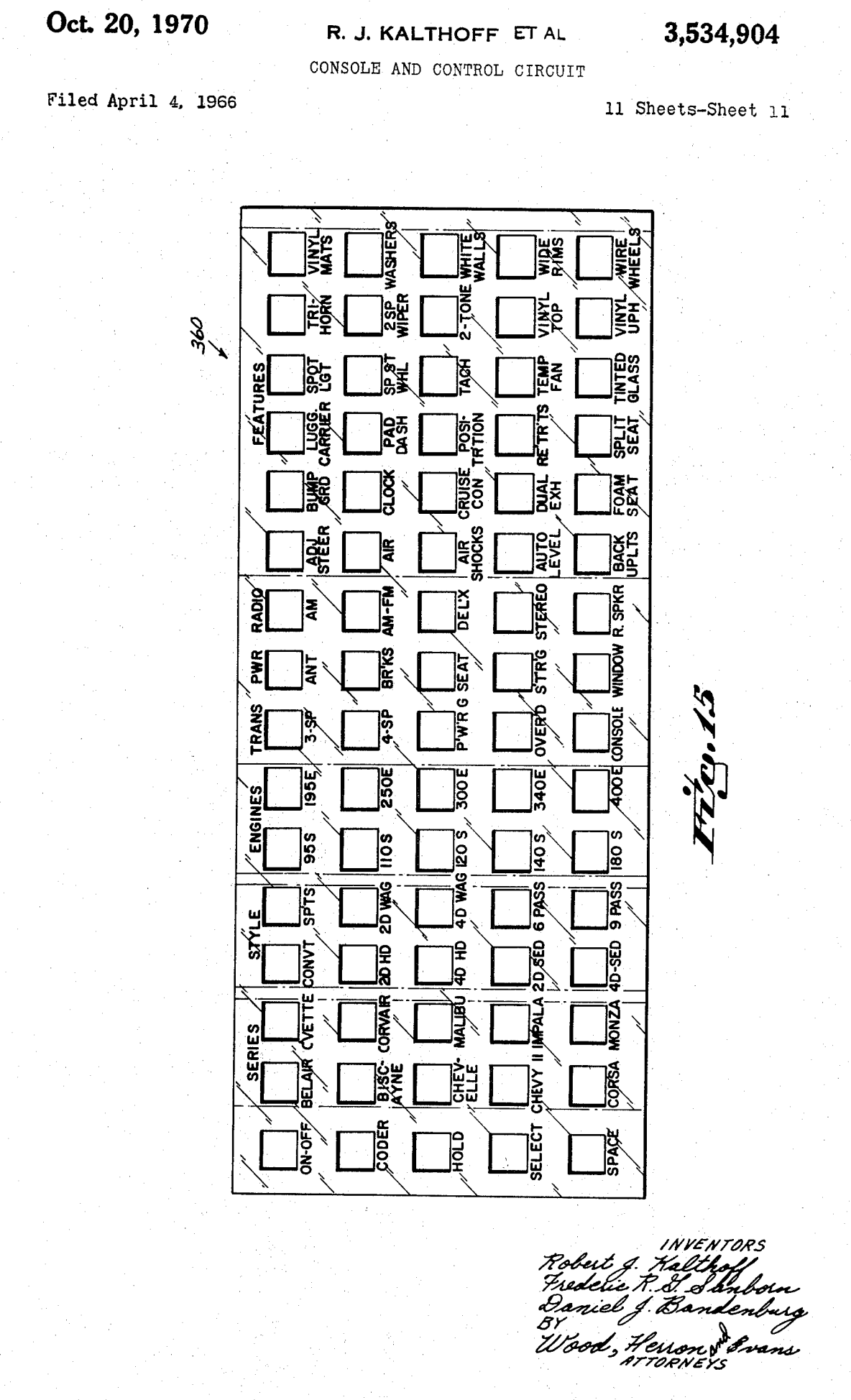

In FIG. 15, an overlay 360 useful in automobile inventory systems is depicted. This overlay has a plurality of apertures through which the various blank keys of a keyboard are adapted to protrude. Eeach aperture bears a designation describing the blank key which, in use, protrudes through that aperture. The overlay 360 is designed for consoles with seventy-five code keys and five function keys. As will be understood by those skilled in the art, the number of code keys in a keyboard or overlay can be varied to meet the needs of the user.

It is contemplated that multiple overlays might be used in conjunction with a single keyboard during an entry operation. For example, in a personnel application employees are often classified by both type of work, such as "administrative," "clerical," or "manufacturing," as well as by their individual skills, such as filing, typing, drilling, milling, pneumatic hammering etc. Recognizing that clerical people have skills, such as typing and filing, which are markedly different from those of one engaged in manufacturing such as drilling, milling etc., it is contemplated that different, or branch, overlays be provided in conjunction with a master overlay for the different types of work. For example, in a given application ten keys of a keyboard may be allotted for skills. While a single overlay covering the entire keyboard permits ten different skills to be designated, if two ten-aperture overlays are provided for alternative use with the skill keys, one having clerical skills and the other manufacturing skills, a total of twenty skills can be effectively handled by the system.

In operation, a first master overlay is used identifying all the keys except the ten skill keys. Then, depending on whether an administrative or clerical key is actuated, one or the other of the two ten-aperture branch skill overlays is used. Thus, if the cards of males, over 35, single . . . in an adminstrative position are desired having certain skills, a ten-aperture branch overlay is used having such skills as typing, filing etc. If the cards of males, over 35, single . . . in manufacturing positions are desired having certain skills, a ten-aperture branch overlay is used having such skills as drilling, milling etc. The master overlay, of course, has apertures bearing designations for the remaining nonskill features, such as male, female; over 35, under 35; married, single, divorced, widowed; administrative, sales, manufacturing etc. The use of branching overlays in conjunction with master overlays enables a larger number of features to be effectively included in the classification scheme of any retrieval system.

In certain applications a keyboard having a single set of five bit keys, in addition to function keys, may be utilized. For example, where all the features or classifications are grouped in mutually exclusive groups of five features, a keyboard having a single set of five bit keys (plus function keys) may be employed of the type shown in FIG. 16, which is useful in personnel applications. This keyboard is provided with thirteen field indicator lamps 5(1)–5(13) arranged in a horizontal row. Arranged under each lamp 5(1)–5(13) are groups 370(1)–370(13) of five mutually exclusive feature designations. For example, under lamp 5(1) are listed five mutually exclusive classifications 370(1) of an employee's years of experience, of which only one can fit any given employee. Under lamp 5(2) are listed five mutually exclusive age classifications 370(2) of which only one can be applicable to any given employee. Similarly, under lamp 5(13) are listed five educational classifications 370(13), which are also mutually exclusive. Aligned with the groups 370(1)– 370(13) are five bit keys 372(a)–372(e), connected as shown in FIG. 13, to provide, when actuated, automatic stepping of the console and coder or selector character field stepping mechanisms, in addition to providing a signal to their respective bit actuators or solenoids. Also provided, are four function keys 9–13 found in the previously described console keyboards.

In operation, assuming that it is desired to enter into a coder "2 years" in field 1, "25 years in field 2, . . . and "college graduate" in field 13, the operator would first depress the on-off key 9 and the coder key 10 energizing the console and coder circuits in the manner described previously. Since no code has yet been entered the console and coder are addressed to field 1 and lamp 5(1) is lighted indicating this address condition. To enter "2 years" into field 1, the operator scans down group 370(1) until he arrives at "2 years" whereupon he actuates the bit key 372(c) corresponding to the third horizontal row of classifications. Depression of the key 372(c) causes the coder c bit solenoid to be actuated and the console and coder stepping mechanisms to advance to the next field. The lighted condition of lamp 5(2) thereafter informs the operator the entry of a feature into field 2 is due. The operator scans down column 370(2) until he reaches "25 years," which in this case is in the top horizontal row, and then actuates bit key 372(a) corresponding to the top row, thereby entering an $a$ into field 2 of the coder and advancing both the coder and console stepping mechanisms to the next field. This process is repeated until key 372(c) corresponding to "college graduate" has been actuated in the thirteenth field.

Figure 16:
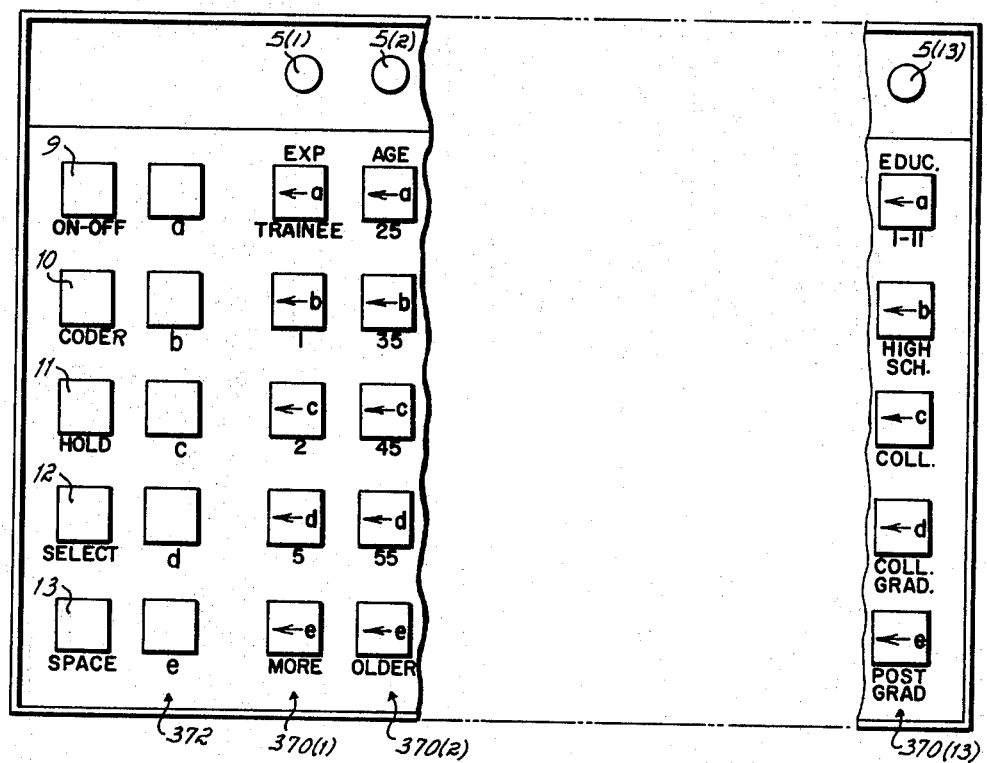
FIG. 16 is a schematic diagram depicting a keyboard and display panel in which redundant keys are eliminated.

One of the advantages of the keyboard of FIG. 16 is that redundant keys are eliminated, reducing console complexity. In addition, there is no need for the operator to known either which bit keys represent the various features or into which fields the mutually exclusive groups are entered.

Of course, the keyboard of FIG. 16 is not limited to use with mutually exclusive groups of features. However, if non-exclusive features do appear in one or more of the vertical columns which are correlated with the different indicating lamps 5(1)–5(13), then the bit keys should be connected as in FIG. 3. With the bit keys so connected automatic spacing will not occur, allowing two or more features to be entered into any given field. To space, following the entry of the desired features into a given field, the space key 13 is actuated.

We claim:

1. In a system having a plurality of character fields into which characters may be sequentially entered, character entry transducer means movable relative to said character fields for sequentially entering characters into said fields in accordance with sequentially generated character code signals, and electrically operated stepping means mechanically connected to said character entry transducer means and actuable in response to receipt of electrical stepping signals for moving said character entry transducer means relative to said character fields, the improvement comprising:

a keyboard unit having a plurality of selectively operable character keys for generating said character code signals in response to the actuation of said character keys;

means for generating an electrical stepping signal each time one of said character keys is actuated; and circuit means for transmitting said character code and electrical stepping signals to said character entry transducer means and said electrically operated stepping means, respectively, to effect the sequential entry of said characters corresponding to said code signals into said character fields as said character entry transducer means is moved by said stepping means from field to field in response to said electrical stepping signals.

2. The combination of claim 1 wherein said keyboard unit further comprises a space key and wherein said stepping signal generating means is further responsive to the actuation of said space key for generating a stepping signal independently of the actuation of said character keys to thereby step said entry means past a character field without entering a character therein.

3. The combination of claim 2 further including character field indicating means responsive to the actuation of said keys for indicating the character field to which said entry means is addressed.

4. The combination of claim 3 wherein said indicating means includes a plurality of character field indicator lamps corresponding in number to said plurality of character fields, said lamps being sequentially energized as said entry means steps from field to field.

5. In control means for controlling apparatus having a plurality of multi-bit character fields into which coded characters may be successively entered, a carriage movable relative to said character fields, an electrically operated stepping means mechanically connected to said carriage and responsive to electrical stepping signals for moving said carriage relative to said character fields, and a character entering plurality of electro-mechanical transducers corresponding in number to the bits of a field, said transducers being movable with said carriage for entering coded characters successively into said fields in response to coded character signals as said carriage is stepped from field to field by said electrically operated stepping means in response to electrical stepping signals, the improvement comprising:
    a keyboard unit having a plurality of character keys for generating character code signals, said character code signals including coded groups of binary signals;
    means for generating an electrical stepping signal each time one of said character keys is actuated; and
    circuit means for transmitting said character code signals and electrical stepping signals to said character entry means to successively actuate selected groups of said plurality of transducers in accordance with said successively generated coded groups of binary signals to thereby successively enter said characters into said character fields as said entry means is stepped from field to field by said electrically operated stepping means in response to said electrical stepping signals.

6. The combination of claim 5 wherein said keyboard unit further comprises a space key and wherein said stepping signal generating means is further responsive to the actuation of said space key for generating a stepping signal independently of the actuation of said character keys to thereby step said entry means past a character field without entering a character therein.

7. The apparatus of claim 5 wherein said keyboard unit further comprises a plurality of selectively operable bit keys for generating character code signals, each of said character code signals including a binary signal effective to actuate an associated one of said transducers.

8. The apparatus of claim 5 wherein said stepping signal generating means is responsive to the actuation of said bit keys for generating a stepping signal.

9. Control apparatus for controlling a coder for edge notching character fields of notch sites on a record in accordance with character code signals, said coder including a selectively actuable site notching punch, a record holder for holding a record edge in site motching disposition relative to said punch, a memory having a plurality of character fields of settable storage elements, the number of storage elements per field corresponding in number to the number of sites per card character field, character fleld indexing means mounting said record holder and said memory and responsive to stepping signals for producing relative field-by-field indexing and shifting motion between said record holder and memory and said punch, a plurality of electromechanical transducers corresponding in number to the number of sites per field, said transducers being selectively operable in response to said character code signals to said successively set groups of storage elements of said fields as said relative field-by-field motion is effected, a sensing station responsive to said set storage elements for actuating said punch to thereby notch said sites of said card in accordance with said character signals, said control apparatus comprising:
    a keyboard unit having a plurality of selectively operable character keys for generating said character code signals in response to the actuation of said character keys, said character code signals comprising groups of coded bit signals;
    means for generating a stepping signal each time one of said character keys is actuated; and
    circuit means for transmitting said character code and stepping signals to said transducers and said indexing and shifting means, respectively to successively set groups of said storage elements corresponding to said groups of coded bit signals on a field-by-field basis as said field-by-field relative motion is effected in response to said successive stepping signals.

10. The combination of claim 9 wherein said keyboard unit further comprises a spacekey and wherein said stepping signal generating means is further responsive to the actuation of said space key for generating a stepping signal independently of the actuation of said character keys to thereby move said punch, transducers, and sensing station relative to said record and said memory an increment corresponding to one field.

11. The combination of claim 10 further including character field indicating means responsive to the actuation of said keys for indicating the character field of storage elements to which said transducers are addressed.

12. The combination of claim 11 wherein said indicating means includes a plurality of character field indicator lamps corresponding in number to said plurality of character fields, said lamps being successively energized as said relative field-by-field indexing and shifting motion is effected.

13. The combination of claim 12 wherein the number of sites per character field is five and the number of storage elements set per field and signals per group is two, the particular two elements set depending on the particular character key actuated.

14. Control apparatus for controlling a coder for edge notching character fields of sites on a record edge in accordance with character code signals, said coder including a group of selectively actuable site notching punches corresponding in number to the number of sites per field, a record holder for holding a record edge in site notching disposition relative to said punches, character field indexing means responsive to stepping signals for indexing and shifting said record and said punches relatively in field-by-field indexing and shifting motion, a plurality of electromechanical transducers corresponding in number to the number of said punches and being selectively operable in response to successive character code signals to successively actuate said punches to successively notch said fields of sites in accordance with said code, said control apparatus comprising:
    keyboard unit having a plurality of selectively operable character keys for generating said character code signals in response to the actuation of said character keys, said character code signals comprising groups of coded bit signals;
    means for generating a stepping signal each time one of said character keys is actuated; and
    circuit means for successively transmitting said character code signals and said stepping signals to said transducers and said indexing and shifting means, respectively, for successively actuating groups of said transducers to successively notch said fields of sites in response to said successive groups of coded bit signals, said notching being on a field-by-field basis as said field-by-field relative motion is effected in response to successive stepping signals.

15. The combination of claim 14 wherein said keyboard unit further comprises a space key and wherein said stepping signal generating means is further responsive to the actuation of said space key for generating a stepping signal independently of the actuation of said character keys to thereby relatively move said record and said punch and transducers an increment corresponding to one character field.

16. The combination of claim 15 further including character field indicating means responsive to the actuation of said keys for indicating the character field to which said transducers are addressed.

17. The combination of claim 16 wherein said indicating means includes a plurality of character field indicator lamps corresponding in number to said plurality of character fields, said lamps being successively energized as said relative field-by-field indexing and shifting motion is effected.

18. The combination of claim 17 wherein the number of sites per field is five and the number of transducers actuated is two, the particular two transducers being actuated in any field being dependent upon the particular one of said character keys actuated.

19. Control means for controlling apparatus having a plurality of multi-bit character fields into which coded characters may be successively entered, a carriage movable relative to said character fields in response to stepping signals, and a character entering plurality of electro-mechanical transducers corresponding in number to the bits of a field, said transducers being movable with said carriage for entering coded characters successively into said fields in response to coded character signals as said carriage steps from field to field, the combination comprising:
- a keyboard having a plurality of character keys arranged along a first axis, each of said keys being operative to produce a character code signal upon actuation,
- means for generating a stepping signal,
- a plurality of character field indicating means responsive to said stepping signals for indicating the character field to which said transducers are addressed, said indicators being arranged along a second axis angularly disposed relative to said first axis,
- at least one row of character-correlated designations arranged parallel to said first axis, each of the designations in said row being located at the intersection of a particular one of said keys and a particular one of said field indicating means and correlated with one of said charatcer keys, a particular designation being entered into a particular character field in response to actuation of the key correlated with said particular designation when said transducers are addressed to said particular character field, and
- circuit means for transmitting said character code and stepping signals to said character entry means to effect the sequential entry of said characters corresponding to said code signals into said character fields as said entry means steps from field to field in response to said stepping signals.

20. Control means for controlling apparatus having a plurality of multi-bit character fields into which coded characters may be successively entered, a carriage movable relative to said character fields in response to stepping signals, and a character entering plurality of electro-mechanical transducers corresponding in number to the bits of a field, said transducers being movable with said carriage for entering coded characters successively into said fields in response to coded character signals as said carriage steps from field to field, the combination comprising:
- means for generating a stepping signal,
- a plurality of character field indicating means responsive to said stepping signals for indicating the character field to which said transducers are addressed,
- a keyboard having character keys operative to produce a character code signal when actuated, said keys being arranged in rows and columns, each of the keys in a column being correlated with a single one of said character field indicating means for providing the keyboard operator with an indication of the column of keys to be used in entering characters into said fields, and
- circuit means for transmitting said character code and stepping signals to said character entry means to effect the sequential entry into said characted field of said correlated characters in response to said character signals as said entry means steps from field to field in response to said stepping signals.

21. In control means for controlling apparatus having a plurality of multi-bit character fields into which coded characters may be successively entered, a carriage movable relative to said character fields, an electrically operated stepping means mechanically connected to said carriage and responsive to electrical stepping signals for moving said carriage relative to said character fields, and a character entering plurality of electro-mechanical transducers corresponding in number to the bits of a field, said transducers being movable with said carriage for entering coded characters successively into said fields in response to coded character signals as said carriage is stepped from field to field by said electrically operated stepping means in response to electrical stepping signals, the improvement comprising:
- a keyboard unit having a plurality of character keys for generating character code signals, said character code signals including coded groups of binary signals;
- means for geneating an electrical stepping signal each time one of said character keys is actuated; and
- circuit means for transmitting said character code signals and electrical stepping signals to said character entry means to successively actuate selected groups of said plurality of transducers in accordance with said successively generated coded groups of binary signals to thereby successively enter said characters into said character fields as said entry means is stepped from field to field by said electrically operated stepping means in response to said electrical stepping signals, and
- a detachable mounted key identifying plate having at least one labeled key receiving aperture therein for visually correlating at least one of said keys with the character code represented by the signal generated thereby.

22. Control means for controlling apparatus having a plurality of multi-bit character fields into which coded characters may be successively entered, a carriage movable relative to said character fields, an electrically operated stepping means mechanically connected to said carriage and responsive to electrical stepping signals for moving said carriage relative to said character fields, and a character entering plurality of electro-mechanical transducers corresponding in number to the bits of a field, said transducers being movable with said carriage for entering coded characters successively into said fields in response to coded character signals as said carriage is stepped from field to field by said electrically operated stepping means in response to electrical stepping signals, the improvement comprising;
- a keyboard unit having a plurality of character keys for generating character code signals, said character code signals including groups of binary signals, said keyboard unit also including a space key,
- means for generating a stepping signal each time one of said character keys is actuated, circuit means for transmitting said characted code signals and electrical stepping signals to said character entry means to successively actuate selected groups of said plurality of transducers in accordance with said successively generated coded groups of binary signals to thereby successively enter said characters into said character fields as said entry means is stepped from field to field by said electrically operated stepping means in response to said electrical stepping signals, said stepping signal generating means also being responsive to actuation of said space key for generating a stepping signal independently of the actuation of said character keys to thereby stepping said entry means past a character field without entering a character therein.

23. The combination of claim 21 further including character field indicating means responsive to the actuation of said keys for indicating the character field to which said entry means is addressed.

24. The combination of claim 23 wherein said indicating means includes a plurality of character field indicator lamps corresponding in number to said plurality of character fields, said lamps being successively energized as said entry means successively steps from field to field.

References Cited

UNITED STATES PATENTS

| | | |
|---|---|---|
| 1,745,172 | 1/1930 | Kurowski et al. _____ 234—91 X |
| 1,985,101 | 12/1934 | Lastier _____ 234—91 X |
| 3,090,550 | 5/1963 | Servillat _____ 234—91 X |
| 2,146,063 | 2/1939 | Gardin et al. |
| 2,225,680 | 12/1940 | Boswau. |
| 2,585,720 | 2/1952 | Anderson. |

OTHER REFERENCES

IBM Technical Disclosure Bulletin, vol. 4, No. 12, pp. 3–4, May 1962.

WILLIAM S. LAWSON, Primary Examiner

U.S. Cl. X.R.

234—91, 124